United States Patent
Fontaine et al.

(10) Patent No.: US 10,450,394 B2
(45) Date of Patent: Oct. 22, 2019

(54) PROCESSES FOR THE PRODUCTION OF HIGH MOLECULAR WEIGHT ETHYLENE/ALPHA-OLEFIN/NON-CONJUGATED INTERPOLYMERS WITH LOW LEVELS OF LONG CHAIN BRANCHING

(71) Applicant: Dow Global Technologies LLC, Midland, MI (US)

(72) Inventors: Philip P. Fontaine, Alvin, TX (US); Lixin Sun, Sugar Land, TX (US); Colin Li Pi Shan, Pearland, TX (US); Juan C. Tuberquia, Manvel, TX (US); Susan G. Brown, Pearland, TX (US); Edward O. Madenjian, Lake Jackson, TX (US); Gregory J. Brennan, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/553,356

(22) PCT Filed: Mar. 1, 2016

(86) PCT No.: PCT/US2016/020212
§ 371 (c)(1),
(2) Date: Aug. 24, 2017

(87) PCT Pub. No.: WO2016/160231
PCT Pub. Date: Oct. 6, 2016

(65) Prior Publication Data
US 2018/0105626 A1  Apr. 19, 2018

Related U.S. Application Data

(60) Provisional application No. 62/141,110, filed on Mar. 31, 2015.

(51) Int. Cl.
| | | |
|---|---|---|
| C08F 4/64 | (2006.01) | |
| C08F 236/20 | (2006.01) | |
| C08F 210/18 | (2006.01) | |
| C08L 23/16 | (2006.01) | |
| C08F 2/01 | (2006.01) | |
| C08F 4/659 | (2006.01) | |

(52) U.S. Cl.
CPC .............. *C08F 210/18* (2013.01); *C08F 2/01* (2013.01); *C08F 4/64189* (2013.01); *C08F 4/64193* (2013.01); *C08F 4/64196* (2013.01); *C08F 236/20* (2013.01); *C08L 23/16* (2013.01); *C08F 4/659* (2013.01); *C08F 4/65908* (2013.01); *C08F 4/65912* (2013.01); *C08F 2500/01* (2013.01)

(58) Field of Classification Search
CPC .......................... C08F 4/64193; C08F 210/18
See application file for complete search history.

(56) References Cited

U.S. PATENT DOCUMENTS

| | | | |
|---|---|---|---|
| 5,919,988 A | 7/1999 | Pazos et al. | |
| 5,977,251 A | 11/1999 | Kao et al. | |
| 6,545,088 B1 | 4/2003 | Kolthammer et al. | |
| 2011/0282018 A1* | 11/2011 | Klosin | C08F 10/00 526/170 |
| 2017/0101493 A1* | 4/2017 | Fontaine | B01J 31/2226 |
| 2017/0101494 A1* | 4/2017 | Fontaine | C08F 210/16 |
| 2017/0101495 A1* | 4/2017 | Kapur | C08F 210/16 |

FOREIGN PATENT DOCUMENTS

| | | |
|---|---|---|
| WO | 2012/027448 A1 | 3/2012 |
| WO | 2013/096573 A1 | 6/2013 |
| WO | 2014/084893 A1 | 6/2014 |
| WO | 2014084892 A1 | 6/2014 |
| WO | 2014/113046 A1 | 7/2014 |

OTHER PUBLICATIONS

PCT/US2016/020212, International Search Report and Written Opinion dated Jun. 17, 2016.
PCT/US2016/020212, International Preliminary Report on Patentability dated Oct. 12, 2017.

* cited by examiner

*Primary Examiner* — Caixia Lu
(74) *Attorney, Agent, or Firm* — Dinsmore & Shohl LLP

(57) ABSTRACT

The invention provides a process to form a polymer composition comprising at least one ethylene/α-olefin/non-conjugated polyene interpolymer, and wherein the polymer composition has at least the following properties: a) a Mw/V0.1 ratio greater than, or equal to, 1.80 (g/mol)/(Pa·s); said process comprising polymerizing one or more mixture(s) comprising ethylene, an α-olefin and a non-conjugated polyene in the presence of a catalyst system comprising a metal-ligand complex of Formula (I), as described herein.

12 Claims, No Drawings

PROCESSES FOR THE PRODUCTION OF HIGH MOLECULAR WEIGHT ETHYLENE/ALPHA-OLEFIN/NON-CONJUGATED INTERPOLYMERS WITH LOW LEVELS OF LONG CHAIN BRANCHING

REFERENCE TO RELATED APPLICATIONS

The present application claims the benefit of U.S. Provisional Application No. 62/141,110, filed Mar. 31, 2015, and incorporated herein by reference.

BACKGROUND

High molecular weight (for example, Mw greater than 150,000 g/mole) ethylene/α-olefin/non-conjugated polyene interpolymers (for example, EPDM terpolymers) with low levels of long chain branching (LCB), as indicated by rheology features (for example, tan delta, V0.1, V100), are useful in many applications, such as TPVs (Thermoplastic Vulcanizates) and high filler compounds. However, production of such high molecular weight interpolymers, in a solution process, has been challenging, for two main reasons: a) the difficulties associated with transporting a high viscosity molten polymer through, and out of, the solution reactors, and b) the need for a catalyst which can produce such high molecular weight interpolymers at commercially viable operating conditions. Thus, there is a need for new polymerization processes to form high molecular weight ethylene/α-olefin/non-conjugated polyene interpolymers with low levels of long chain branching (LCB). This need has been met by the following invention.

SUMMARY OF THE INVENTION

The invention provides a process to form a polymer composition comprising at least one ethylene/α-olefin/non-conjugated polyene interpolymer, and wherein the polymer composition has at least the following properties:
a) a Mw/V0.1 ratio greater than, or equal to, 1.80 (g/mol)/(Pa·s);
said process comprising polymerizing one or more mixture(s) comprising ethylene, an α-olefin and a non-conjugated polyene in the presence of a catalyst system comprising a metal-ligand complex of Formula (I):

(Formula I)

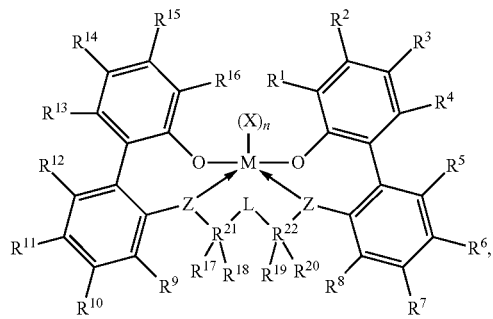

wherein:

M is titanium, zirconium, or hafnium, each independently being in a formal oxidation state of +2, +3, or +4; and n is an integer of from 0 to 3, and wherein when n is 0, X is absent; and Each X, independently, is a ($C_1$-$C_{40}$)hydrocarbyl, a ($C_1$-$C_{40}$)heterohydrocarbyl, or a halide, and wherein each X, independently, is a monodentate ligand that is neutral, monoanionic, or dianionic; or wherein two Xs are taken together to form a bidentate ligand that is neutral, monoanionic, or dianionic; and wherein X and n are chosen, in such a way, that the metal-ligand complex of Formula I is, overall, neutral; and each Z independently is an oxygen atom, a sulfur atom, —N[($C_1$-$C_{40}$)hydrocarbyl]-, or —P[($C_1$-$C_{40}$)hydrocarbyl]-; and L is a substituted or unsubstituted ($C_1$-$C_{40}$)hydrocarbylene, or a substituted or unsubstituted ($C_1$-$C_{40}$)heterohydrocarbylene, and wherein, for L, the ($C_1$-$C_{40}$)hydrocarbylene has a portion that comprises a 1-carbon atom to 10-carbon atom linker backbone, linking $R^{21}$ and $R^{22}$ in Formula I (to which L is bonded), or wherein, for L, the ($C_1$-$C_{40}$)heterohydrocarbylene has a portion that comprises a 1-atom to 10-atom linker backbone, linking $R^{21}$ and $R^{22}$ in Formula I, wherein each of the 1 to 10 atoms of the 1-atom to 10-atom linker backbone of the ($C_1$-$C_{40}$)heterohydrocarbylene, independently, is one of the following: i) a carbon atom, ii) a heteroatom, wherein each heteroatom independently is —O— or —S—, or iii) a substituent selected from —S(O)—, —S(O)$_2$—, —Si($R^C$)$_2$—, —Ge($R^C$)$_2$—, —P($R^C$)—, or —N($R^C$)—, and wherein each $R^C$ is, independently, a substituted or unsubstituted ($C_1$-$C_{30}$)hydrocarbyl, or a substituted or unsubstituted ($C_1$-$C_{30}$) heterohydrocarby; and $R^{21}$ and $R^{22}$ are each, independently, C or Si; and $R^1$ through $R^{20}$ are each, independently, selected from the group consisting of following: a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, —P($R^C$)$_2$, —N($R^C$)$_2$, —OR$^C$, —SR$^C$, —NO$_2$, —CN, —CF$_3$, —S(O)R$^C$, —S(O)$_2$R$^C$, —N=C($R^C$)$_2$, —OC(O)R$^C$, —C(O)OR$^C$, —N(R)C(O)R$^C$, —C(O)N($R^C$)$_2$, a halogen atom, and a hydrogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; and wherein, when $R^{17}$ is a hydrogen atom, then $R^{18}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, —P($R^C$)$_2$, —N($R^C$)$_2$, —OR$^C$, —SR$^C$, —NO$_2$, —CN, —CF$_3$, —S(O)R$^C$, —S(O)$_2$R$^C$, —N=C($R^C$)$_2$, —OC(O)R$^C$, —C(O)OR$^C$, —N(R)C(O)R$^C$, —C(O)N($R^C$)$_2$, a halogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; or wherein, when $R^{18}$ is a hydrogen atom, then $R^{17}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, —P($R^C$)$_2$, —N($R^C$)$_2$, —OR$^C$, —SR$^C$, —NO$_2$, —CN, —CF$_3$, —S(O)R$^C$, —S(O)$_2$R$^C$, —N=C($R^C$)$_2$, —OC(O)R$^C$, —C(O)OR$^C$, —N(R)C(O)R$^C$, —C(O)N($R^C$)$_2$, a halogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; and/or wherein, when $R^{19}$ is a hydrogen atom, then $R^{20}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, —P($R^C$)$_2$, —N($R^C$)$_2$, —OR$^C$, —SR$^C$, —NO$_2$, —CN, —CF$_3$, —S(O)R$^C$, —S(O)$_2$R$^C$, —N=C($R^C$)$_2$, —OC(O)R$^C$, —C(O)OR$^C$, —N(R)C(O)R$^C$, —C(O)N($R^C$)$_2$, a halogen atom; and wherein each $R^C$ is independently a substituted or unsubstituted $(C_1-C_{30})$hydrocarbyl, or a substituted or unsubstituted $(C_1-C_{30})$ heterohydrocarbyl; or wherein, when $R^{20}$ is a hydrogen atom, then $R^{19}$ is a substituted or unsubstituted $(C_1-C_{40})$hydrocarbyl, a substituted or unsubstituted $(C_1-C_{40})$heterohydrocarbyl, —Si$(R^C)_3$, —Ge$(R^C)_3$, —P$(R^C)_2$, —N$(R^C)_2$, —OR$^C$, —SR$^C$, —NO$_2$, —CN, —CF$_3$, —S(O)R$^C$, —S(O) R$^C$, —N═C$(R^C)_2$, —OC(O)R$^C$, —C(O)OR$^C$, —N(R)C(O)R$^C$, —C(O)N$(R^C)_2$, a halogen atom; and wherein each $R^C$ is independently a substituted or unsubstituted $(C_1-C_{30})$hydrocarbyl, or a substituted or unsubstituted $(C_1-C_{30})$ heterohydrocarbyl; and wherein, for Formula I, two or more of $R^1$ through $R^{22}$, optionally, may form one or more ring structures, and wherein each ring structure has from 3 to 50 atoms in the ring, excluding any hydrogen atoms.

DETAILED DESCRIPTION OF THE INVENTION

It has been discovered that the inventive processes can be used to form ethylene/α-olefin/non-conjugated polyene interpolymers (for example, EPDM terpolymers) with very low levels of long chain branching (LCB). The resulting interpolymers exhibited unique rheological behavior (i.e., high tan delta and low V0.1/V100), enabling such interpolymers to be produced and transported through the devolatilization units and gear pumps, typically used in the solution polymerization processes. These high molecular weight interpolymers can be used to form improved TPV formulations and high filler formulations, each requiring higher performing polymers with improved mechanical properties, and better processability (for example, faster mixing of compounds or improved extrusion processability).

As discussed above, the invention provides a process to form a polymer composition comprising at least one ethylene/α-olefin/non-conjugated polyene interpolymer, and wherein the polymer composition has at least the following properties:

a) a Mw/V0.1 ratio greater than, or equal to, 1.80 (g/mol)/(Pa·s), or greater than, or equal to, 1.85 (g/mol)/(Pa·s), or greater than, or equal to, 1.90 (g/mol)/(Pa·s), or greater than, or equal to, 1.95 (g/mol)/(Pa·s), or greater than, or equal to, 2.00 (g/mol)/(Pa·s);

said process comprising polymerizing one or more mixture(s) comprising ethylene, an α-olefin and a non-conjugated polyene in the presence of a catalyst system comprising a metal-ligand complex of Formula (I):

(Formula I)

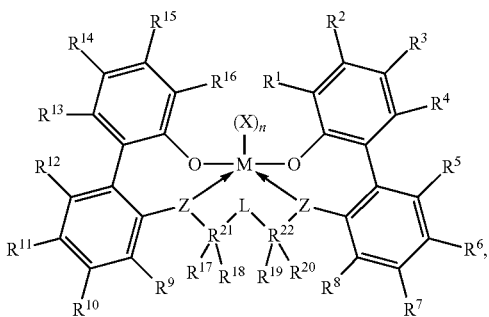

as described herein. Here the Mw is the Mw (conv gpc).

An inventive process may comprise a combination of two or more embodiments as described herein.

The metal-ligand complex of Formula I may comprise a combination of two or more embodiments as described herein.

The polymer composition may comprise a combination of two or more embodiments as described herein.

As used herein, R1=$R^1$, R2=$R^2$, R3=$R^3$, and so forth. As known in the art, O is oxygen, S is sulfur, Si is silicon, and so forth.

In one embodiment, a Mw/V0.1 ratio less than, or equal to, 10.00 (g/mol)/(Pa·s), or less than, or equal to, 9.50 (g/mol)/(Pa·s), or less than, or equal to, 9.00 (g/mol)/(Pa·s), or less than, or equal to, 8.50 (g/mol)/(Pa·s). Here the Mw is the Mw (conv gpc).

In one embodiment, the polymer composition has a tan delta (0.1 rad/sec, 190° C.) greater than, or equal to, 1.50, or greater than, or equal to, 1.55, or greater than, or equal to, 1.60, or greater than, or equal to, 1.65, or greater than, or equal to, 1.70.

In one embodiment, the polymer composition has a tan delta (0.1 rad/sec, 190° C.) less than, or equal to, 6.00, or less than, or equal to, 5.50, or less than, or equal to, 5.00, or less than, or equal to, 4.50, or less than, or equal to, 4.00.

In one embodiment, the process comprises polymerizing the one or more mixture(s) in one or more reactors, and wherein the ethylene conversion in at least one reactor is less than 90.0%. In a further embodiment, the ethylene conversion is less than 89.0%, or less than 88.0%. In one embodiment, the ethylene conversion in at least one reactor is greater than 50.0%, or greater than 55.0%, or greater than 60.0%.

In one embodiment, the process comprises polymerizing the one or more mixture(s) in one or more reactor(s), and wherein the reactor temperature in at least one reactor is less than 150° C., or less than 140° ° C., or less than 145° C.

In one embodiment, the process comprises polymerizing the one or more mixture(s) in one or more reactor(s), and wherein the reactor temperature in at least one reactor is greater than 90° C., or greater than 100° C., or greater than 110° C.

In one embodiment, the polymer composition has a V0.1/V100 less than, or equal to, 35.0, or less than, or equal to, 32.0, or less than, or equal to, 30.0.

In one embodiment, the polymer composition has a weight average molecular weight (Mw) greater than, or equal to, 120,000 g/mole, or greater than, or equal to, 130,000 g/mole, or greater than, or equal to, 140,000 g/mole, or greater than, or equal to, 150,000 g/mole.

In one embodiment, the polymer composition has a weight average molecular weight (Mw) less than, or equal to, 500,000 g/mole, or less than, or equal to, 400,000 g/mole, or less than, or equal to, 300,000 g/mole.

In one embodiment, the polymer composition has molecular weight distribution (MWD) from 1.80 to 3.50, or from 1.85 to 3.20, or from 1.90 to 3.10.

In one embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition comprises two ethylene/α-olefin/non-conjugated polyene interpolymers, and wherein the interpolymers differ in one or more of the following properties: Mw, Mn, MWD, Mn, WD, V0.1, V100, V0.1/V100, density and/or Mooney Viscosity. In a further embodiment, each ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the process comprises polymerizing the one or more mixture(s) in one reactor or in two reactors. For example one or more polymerization reactors, connected in parallel, series, or combinations thereof.

In one embodiment, the process of any one of the previous claims, wherein the process comprises polymerizing the one or more mixture(s) in one or more reactor(s) is a solution polymerization. As used herein the term "solution polymerization," refers to a polymerization process in which the polymer formed is soluble in reaction medium (for example, a hydrocarbon-based solvent like ISOPAR E). The solubility of the polymer will depend primarily on the polymerization temperature and the polymer concentration.

In one embodiment, the polymerization takes place at a temperature from 90° C. to 200° C., further from 95° C. to 180° C., further from 100° C. to 160° C.

In one embodiment, two or more co-catalysts are used in an inventive process. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis (pentafluorophenyl)borate(1-) amine, triethyl aluminum (TEA), and any combinations thereof.

In one embodiment, the catalyst system further comprises at least one cocatalyst selected from a borate, an alkyl aluminum, an aluminoxane, or a combination thereof.

In one embodiments, one or more of the foregoing activating co-catalysts are used in combination with each other. An especially preferred combination is a mixture of a tri((C$_1$-C$_4$)hydrocarbyl)aluminum, tri((C$_1$-C$_4$)hydrocarbyl) borane, or an ammonium borate with an oligomeric or polymeric alumoxane compound.

In one embodiment, the ratio of total number of moles of one or more metal-ligand complexes of Formula I to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less.

In one embodiment, for Formula I, each (C$_1$-C$_{40}$)hydrocarbyl is not substituted, and each (C$_1$-C$_{40}$)heterohydrocarbyl is not substituted.

In one embodiment, for Formula I, at least one (C$_1$-C$_{40}$) hydrocarbyl, and/or at least one (C$_1$-C$_{40}$)heterohydrocarbyl is, independently, substituted with at least on R$^S$ substituent, and wherein each R$^S$ substituent is, independently, selected from the following: a halogen atom, a polyfluoro substituent, a perfluoro substituent, F$_3$C—, FCH$_2$O—, F$_2$HCO—, F$_3$CO—, (R$^C$)$_3$Si—, (R$^C$)$_3$Ge, (R$^C$)O—, (R$^C$)S—, (R$^C$)S (O)—, (R$^C$)S(O)$_2$—, (R$^C$)$_2$P—, (R$^C$)$_2$N—, (R$^C$)$_2$C=N—, NC—, (R$^C$)C(O)O—, (R$^C$)OC(O)—, (R$^C$)C(O)N(R$^C$)—, or (R$^C$)$_2$NC(O)—; and wherein each R$^C$ is independently a substituted or unsubstituted (C$_1$-C$_{30}$)hydrocarbyl, or a substituted or unsubstituted (C$_1$-C$_{30}$) heterohydrocarby; or wherein each (C$_1$-C$_{40}$)hydrocarbyl, and each (C$_1$-C$_{40}$)heterohydrocarbyl is, independently, substituted with an unsubstituted (C$_1$-C$_{18}$)-alkylene.

In one embodiment, two or more of R$^1$ to R$^{22}$ do not form one or more ring structures.

In one embodiment, for Formula I, R$^1$ and R$^{16}$ are each independently selected from the following i) through vii):

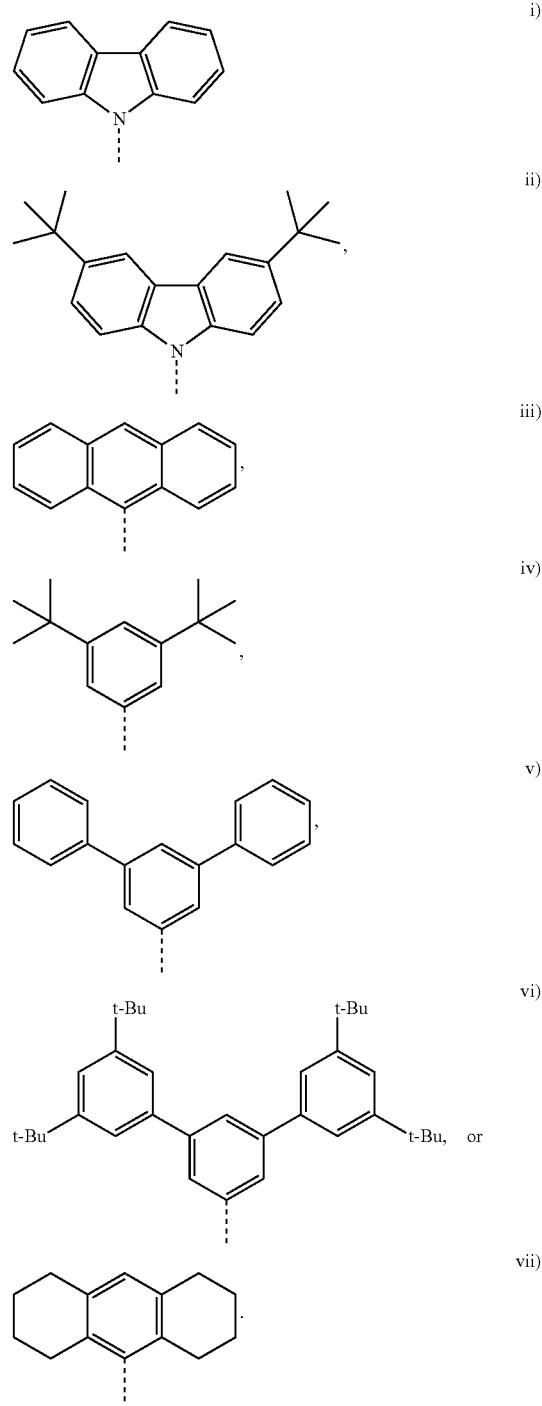

In structures i) through vii) above, each dashed line (---) represent the point of attachment (covalent bond) to the remaining metal ligand complex of Formula I.

M is titanium, zirconium, or hafnium. In one embodiment, M is zirconium or hafnium, and in another embodiment M is zirconium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of Formula (I) is, overall, neutral. In some embodiments each X independently is the monodentate ligand. In one embodiment, when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, $HC(O)O^-$, $(C_1-C_{40})$hydrocarbylC(O)O$^-$, $HC(O)N(H)^-$, $(C_1-C_{40})$hydro-carbylC(O)N(H)$^-$, $(C_1-C_{40})$hydrocarbylC(O)N((C_1-C_{20})$hydrocarbyl)$^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In one embodiments, each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In one embodiments, at least two X are different. In some embodiments, n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 at two X are taken together to form a bidentate ligand. In some embodiments, the bidentate ligand is 2,2-dimethyl-2-silapropane-1,3-diyl or 1,3-butadiene.

In one embodiment, for Formula I, M is zirconium.

In one embodiment, for Formula I, M is zirconium; and each Z is an oxygen atom

In one embodiment, for Formula I, M is zirconium or hafnium, and further zirconium; n is 2; each X, independently, is a $(C_1-C_{40})$hydrocarbyl, a $(C_1-C_{40})$heterohydrocarbyl, or a halide; and $R^2$, $R^4$, $R^5$, $R^7$, $R^8$, $R^9$, $R^{10}$, $R^{12}$, $R^{13}$ and $R^{15}$ are each hydrogen.

In one embodiment, each X is, independently, a $(C_1-C_{40})$hydrocarbyl, a $(C_1-C_{40})$-heterohydrocarbyl, or a halide. In a further embodiment both X are the same.

In one embodiment, each X is, independently, a $(C_1-C_{40})$hydrocarbyl, or a halide. In a further embodiment both X are the same.

In one embodiment, each X is, independently, a $(C_1-C_{40})$hydrocarbyl. In a further embodiment, both X groups are the same.

In one embodiment, each X is, independently, a $(C_1-C_3)$alkyl, further ethyl or methyl, and further methyl. In a further embodiment both X are the same.

In one embodiment, L is selected from the following: —CH$_2$—, —CH$_2$CH$_2$—, —CH$_2$CH$_2$CH$_2$—; —CH(CH$_3$)CH$_2$CH(CH$_3$)—; —CH(CH$_3$)CH(CH$_3$)CH(CH$_3$)—; —CH$_2$C(CH$_3$)$_2$CH$_2$—; 1,3-cyclopentane-diyl; or 1,3-cyclohexane-diyl. In some embodiments L comprises the 4-carbon atom linker backbone (e.g., L is —CH$_2$CH$_2$CH$_2$CH$_2$—; —CH$_2$C(CH$_3$)$_2$C(CH$_3$)$_2$CH$_2$—; 1,2-bis(methylene)cyclohexane; or 2,3-bis(methylene)-bicyclco[2.2.2]octane). In some embodiments L comprises the 5-carbon atom linker backbone (e.g., L is —CH$_2$CH$_2$CH$_2$CH$_2$CH$_2$— or 1,3-bis(methylene)cyclohexane). In some embodiments L comprises the 6-carbon atom linker backbone (e.g., L is —CH$_2$CH$_2$CH$_2$CH$_2$CH$_2$CH$_2$— or 1,2-bis(ethyl ene)cyclohexane)

In one embodiment, for Formula I, L is selected from the following: —CH2CH2CH2-, —CH2CH2- or —CH2-; and further —CH2CH2- or —CH2-, and further —CH2-.

In one embodiment, for Formula I, $R^2$, $R^4$, $R^5$, $R^7$, $R^8$, $R^9$, $R^{10}$, $R^{12}$, $R^{13}$ and $R^{15}$ are each hydrogen.

In one embodiment, for Formula I, $R^{21}$ and $R^{22}$ are each C (carbon).

In one embodiment, $R^{17}$ or $R^{18}$ is hydrogen, and the other is an unsubstituted hydrocarbyl. In a further embodiment, $R^{19}$ or $R^{20}$ is hydrogen, and the other is an unsubstituted hydrocarbyl.

In one embodiment, $R^{19}$ or $R^{20}$ is hydrogen, and the other is an unsubstituted hydrocarbyl. In a further embodiment, $R^{17}$ or $R^{18}$ is hydrogen, and the other is an unsubstituted hydrocarbyl.

In one embodiment, for Formula I, $R^{17}$, $R^{18}$, $R^{19}$ and $R^{20}$ are each, independently, an unsubstituted $(C_1-C_{40})$hydrocarbyl. In a further embodiment, $R^{17}$, $R^{18}$, $R^{19}$ and $R^{20}$ are each, independently, an unsubstituted $(C_1-C_{30})$hydrocarbyl, further an unsubstituted $(C_1-C_{20})$hydrocarbyl, further an unsubstituted $(C_1-C_{10})$hydrocarbyl, further an unsubstituted $(C_1-C_5)$hydrocarbyl, and further an unsubstituted $(C_1-C_3)$hydrocarbyl.

In one embodiment, for Formula I, $R^3$ and $R^{14}$ are each, independently, an unsubstituted $(C_1-C_{40})$hydrocarbyl. In a further embodiment, $R^3$ and $R^{14}$ are each, independently, an unsubstituted $(C_1-C_{30})$hydrocarbyl, further an unsubstituted $(C_1-C_{20})$hydrocarbyl, further an unsubstituted $(C_1-C_{10})$hydrocarbyl, further an unsubstituted $(C_1-C_5)$hydrocarbyl, and further an unsubstituted $(C_1-C_3)$hydrocarbyl.

In one embodiment, for Formula I, $R^6$ and $R^{11}$ are each, independently, an unsubstituted $(C_1-C_{40})$hydrocarbyl or a halogen. In a further embodiment, $R^6$ and $R^{11}$ are each, independently, an unsubstituted $(C_1-C_{30})$hydrocarbyl, further an unsubstituted $(C_1-C_{20})$hydrocarbyl, further an unsubstituted $(C_1-C_{10})$hydrocarbyl, further an unsubstituted $(C_1-C_5)$hydrocarbyl, and further an unsubstituted $(C_1-C_3)$hydrocarbyl. In another embodiment, for Formula I, $R^6$ and $R^{11}$ are each, independently a halogen, and further Cl or F, and further F.

In one embodiment, Formula I is selected from the following I1 through I12:

I1
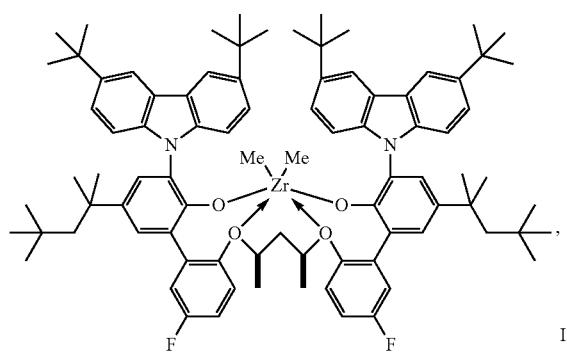
I2
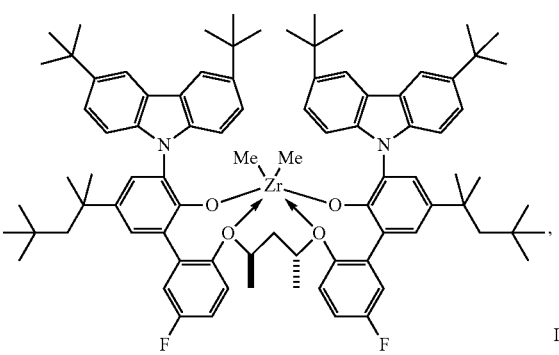
I3
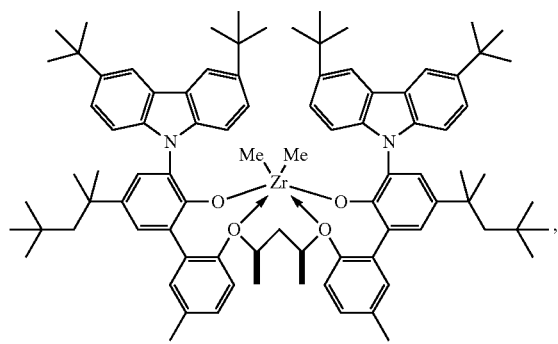
I4
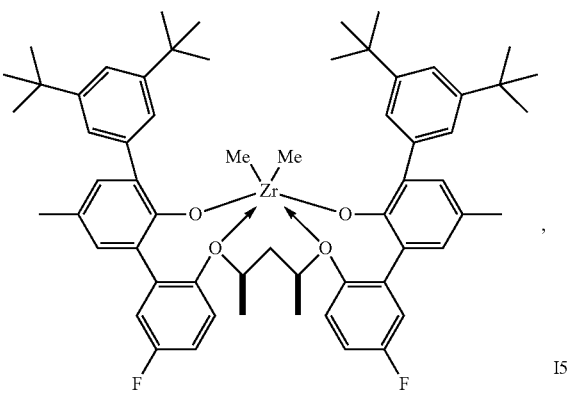
I5
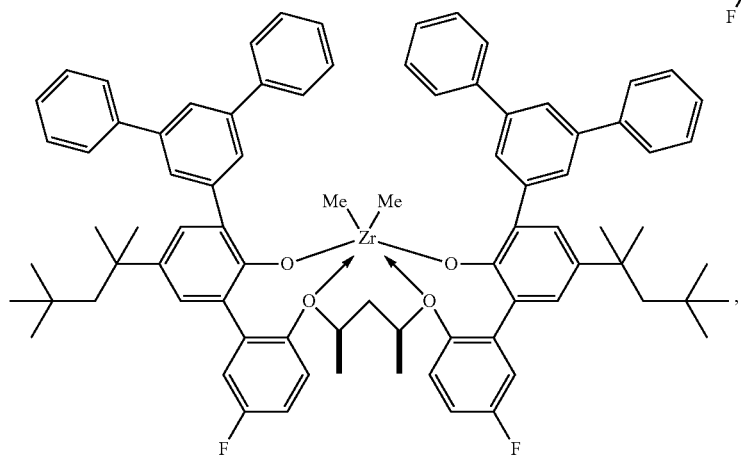
I6
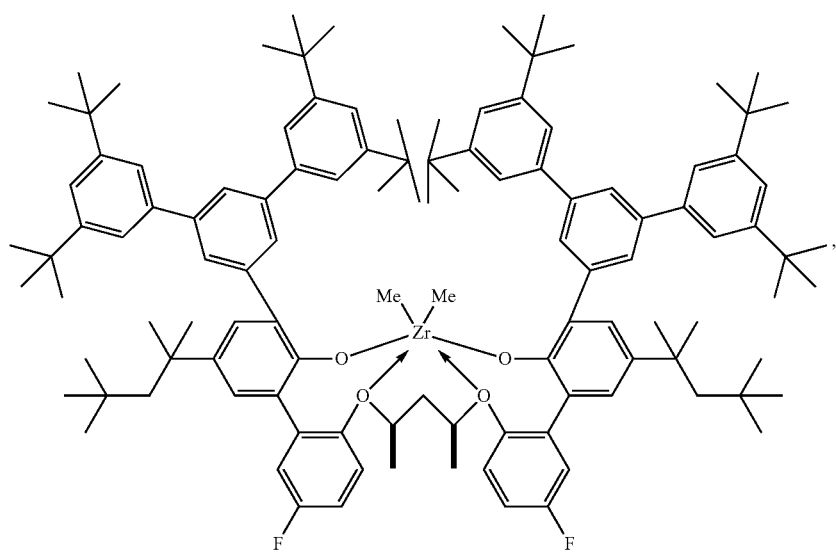

-continued

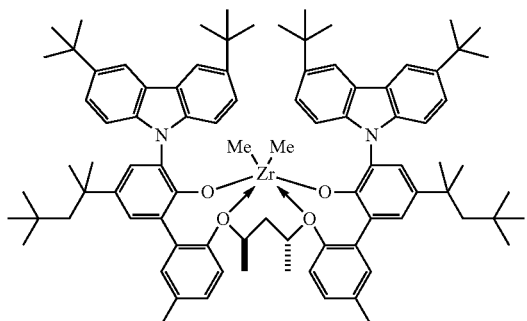
I7

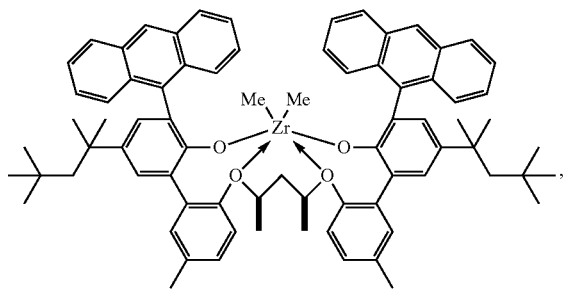
I8

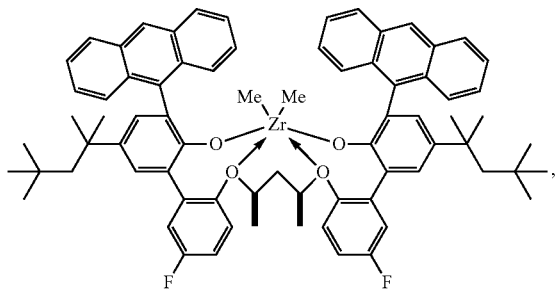
I9

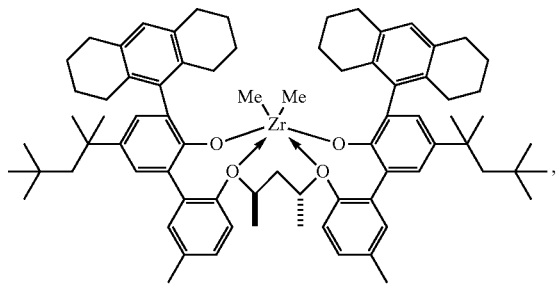
I10

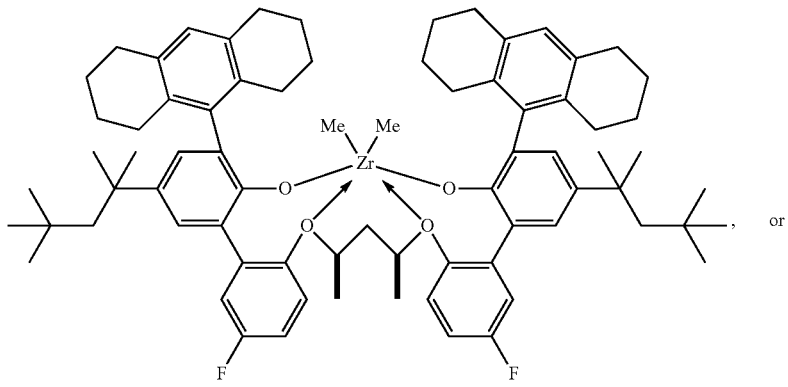
I11

, or

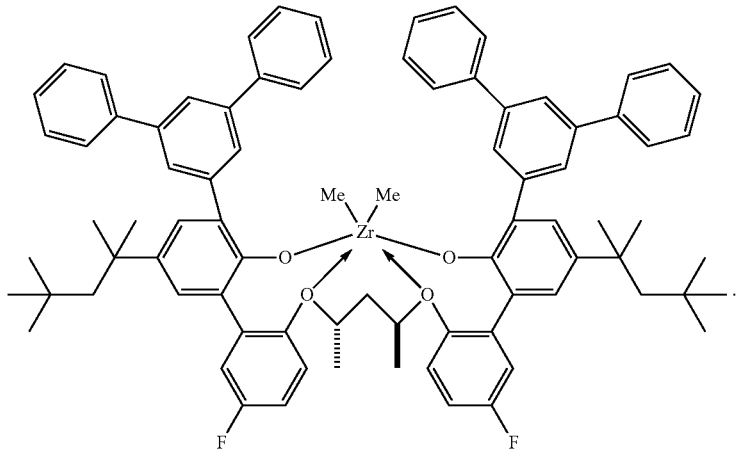
I12

The metal-ligand complex of Formula (I) is described, herein, using conventional chemical group terminology. When used to describe certain carbon atom-containing chemical groups (e.g., $(C_1-C_{40})$alkyl), the parenthetical expression $(C_1-C_{40})$ can be represented by the form "$(C_x-C_y)$," which means that the unsubstituted version of the chemical group comprises from a number x carbon atoms to a number y carbon atoms, wherein each x and y independently is an integer as described for the chemical group.

The term "substituted," as used herein, with respect to a chemical compound, refers to a substituent that comprises at least one heteroatom (for example, O, S, N, P, etc.) Substituents include, but are not limited to, the $R^S$ substituents, as noted above, as the following: a halogen atom, a polyfluoro substituent, a perfluoro substituent, $F_3C-$, $FCH_2O-$, $F_2HCO-$, $F_3CO-$, $(R^C)_3Si-$, $(R^C)_3Ge-$, $(R^C)O-$, $(R^C)S-$, $(R^C)S-$, $(R^C)S(O)-$, $(R^C)S(O)_2-$, $(R^C)_2P-$, $(R^C)_2N-$, $(R^C)_2C=N-$, $NC-$, $(R^C)C(O)O-$, $(R^C)OC(O)-$, $(R^C)C(O)N(R^C)-$, and $(R^C)_2NC(O)-$; wherein $R^C$ is described above.

The term "unsubstituted," as used herein, with respect to a chemical compound, refers to the lack of a substituent that comprises at least one heteroatom (for example, O, S, N, P, etc.).

The term "hydrocarbyl," as used herein, refers to a monovalent (monoradical or radical) chemical group containing only hydrogen and carbon atoms.

The term "substituted hydrocarbyl," as used herein, refers to a hydrocarbyl, in which at least one hydrogen atom is substituted with a substituent that comprises at least one heteroatom. Heteroatoms include, but are not limited to, O, N, P and S.

The term "heterohydrocarbyl," as used herein, refers to a hydocarbyl, in which at least one carbon atom, or CH group, or CH2 group, is substituted with a heteroatom or a chemical group containing at least one heteroatom. Heteroatoms include, but are not limited to, O, N, P and S.

The term "substituted heterohydrocarbyl," as used herein, refers to a heterohydrocarbyl in which at least one hydrogen atom is substituted with a substituent that comprises at least one heteroatom. Heteroatoms include, but are not limited to, O, N, P and S.

The term "hydrocarbylene," as used herein, refers to a divalent (diradical) chemical group containing only hydrogen and carbon atoms.

The term "substituted hydrocarbylene," as used herein, refers to a hydrocarbylene, in which at least one hydrogen atom is substituted with a substituent that comprises at least one heteroatom. Heteroatoms include, but are not limited to, O, N, P and S.

The term "heterohydrocarbylene," as used herein, refers to a hydrocarbylene, in which at least one carbon atom, or CH group, or CH2 group, is substituted with a heteroatom or a chemical group containing at least one heteroatom. Heteroatoms include, but are not limited to, O, N, P and S.

The term "substituted heterohydrocarbylene," as used herein, refers to a heterohydrocarbylene, in which at least one hydrogen atom is substituted with a substituent that comprises at least one heteroatom. Heteroatoms include, but are not limited to, O, N, P and S.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride ($F^-$), chloride ($Cl^-$), bromide ($Br^-$), or iodide ($I^-$) anion.

Preferably, there are no O—O, S—S, or O—S bonds, other than O—S bonds in an S(O) or $S(O)_2$ diradical functional group, in the metal-ligand complex of Formula (I). More preferably, there are no O—O, N—N, P—P, N—P, S—S, or O—S bonds, other than O—S bonds in an S(O) or $S(O)_2$ diradical functional group, in the metal-ligand complex of formula (I).

Polymer Composition

The invention also provides a polymer composition, comprising at least one ethylene/α-olefin/non-conjugated polyene interpolymer, said composition formed by an inventive process described herein.

The polymer composition may comprise a combination of two or more embodiments as described herein.

In one embodiment, the polymer composition has a Mw/V0.1 ((g/mol)/(Pa·s)) from 1.80 to 10.00, or from 1.85 to 9.50, or from 1.90 to 9.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a tan delta (0.1 rad/sec, 190° C.) from 1.50 to 5.50, or from 1.50 to 5.00, or from 1.50 to 4.50. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a viscosity at 0.1 rad/sec, 190° C., greater than, or equal to, 10,000 Pa·s, or greater than, or equal to, 12,000 Pa·s, or greater than, or equal to, 15,000 Pa·s. In a further embodiment, the ethylene/α-olefin/non-conjugated polyene interpolymer is an ethylene/α-olefin/diene interpolymner (EAODM). In a further embodiment, the interpolymer is an EPDM. In a further embodiment, the diene is ENB.

In one embodiment, the polymer composition has a viscosity at 0.1 rad/sec, 190° C., less than, or equal to, 130,000 Pa·s, or less than, or equal to, 125,000 Pa·s, or less than, or equal to, 120,000 Pa·s, or less than, or equal to, 110,000 Pa·s, or less than, or equal to, 100,000 Pa·s. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a rheology ratio (V0.1/V100 at 190° C.) greater than, or equal to, 2.0, or greater than, or equal to, 2.5, or greater than, or equal to, 3.0. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a rheology ratio (V0.1/V100 at 190° C.) less than, or equal to, 35.0, or less than, or equal to, 32.0, or less than, or equal to, 30.0. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a weight average molecular weight (Mw) greater than, or equal to, 120,000 g/mole, or greater than, or equal to, 150,000 g/mole, or greater than, or equal to, 180,000 g/mole. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a weight average molecular weight (Mw) less than, or equal to, 400,000 g/mole, or less than, or equal to, 350,000 g/mole, or less than, or equal to, 300,000 g/mole. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a MWD) less than, or equal to, 3.50, further less than, or equal to, 3.20, further less than, or equal to, 3.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a MWD greater than, or equal to, 1.80, or greater than, or equal to, 1.90, or greater than, or equal to, 2.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a "13C NMR % Peak Area," which is the {[(13C NMR peak area from 21.3 ppm to 21.8 ppm) divided by the (total integral area from 19.5 ppm to 22.0 ppm)]×100}, that is greater than, or equal to, 3.0 percent, or greater than, or equal 4.0 percent, or greater than, or equal 5.0 percent, as determined by 13C NMR. In a further embodiment, the ethyl ene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a "13C NMR % Peak Area," which is the {[(13C NMR peak area from 21.3 ppm to 21.8 ppm) divided by the (total integral area from 19.5 ppm to 22.0 ppm)]×100}, that is from 3.0 to, 30.0 percent, or from 4.0 to 30.0 percent, or from 5.0 to 30.0 percent, as determined by 13C NMR. In a further embodiment, the ethylene/α-olefin/non-conjugated polyene interpolymer is an ethyl ene/α-olefin/diene interpolymer (EAODM). In a further embodiment, the interpolymer is an EPDM. In a further embodiment, the diene is ENB.

In one embodiment, the polymer composition comprises greater than, or equal to, 90 weight percent, or greater than, or equal to, 95 weight percent, or greater than, or equal to, 98 weight percent, of the ethylene/alpha-olefin/non-conjugated polyene interpolymer, based on the weight of the polymer composition. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition further comprises a second ethylene/alpha-olefin/non-conjugated polyene interpolymer, and wherein the interpolymer and second interpolymer differs in one or more of the following properties: Mw, Mn, MWD, V0.1, V100, V0.1/V100, density and/or Mooney Viscosity. In a further embodiment, the polymer composition comprises greater than, or equal to, 90 weight percent, or greater than, or equal to, 95 weight percent, or greater than, or equal to, 98 weight percent, of the sum weight of the second ethylene/alpha-olefin/non-conjugated polyene interpolymer and the ethylene/alpha-olefin/non-conjugated polyene interpolymer, based on the weight of the polymer composition. In a further embodiment, each ethylene/α-olefin/non-conjugated polyene interpolymer is an ethylene/α-olefin/diene interpolymer (EAODM). In a further embodiment, each interpolymer is an EPDM. In a further embodiment, the diene is ENB.

In one embodiment, the polymer composition has a Mooney Viscosity greater than, or equal to, 15, or greater than, or equal to, 20, or greater than, or equal to, 30, or greater than, or equal to, 40, or greater than, or equal to, 50, or greater than, or equal to, 60, or greater than, or equal to, 70 (ML 1+4, 125° C.). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition has a Mooney Viscosity less than, or equal to, 150, or less than, or equal to, 140, or less than, or equal to, 130, or less than, or equal to, 120 (ML 1+4, 125° C.). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

Mooney viscosity is that of the polymer composition without filler and without oil.

In one embodiment, the polymer composition comprises from 40 to 80 weight percent ethylene, or from 45 to 75 weight percent ethylene, based on the weight of polymer composition. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition comprises from 2.0 to 7.0 weight percent, or from 2.5 to 6.5 weight percent, or from 3.0 to 6.0 weight percent, or from 3.5 to 5.5 weight percent, based on the weight of polymer composition. In a further embodiment, the ethylene/α-olefin/non-conjugated polyene interpolymer is an ethyl ene/α-olefin/diene interpolymer (EAODM). In a further embodiment, the interpolymer is an EPDM. In a further embodiment, the diene is ENB.

In one embodiment, the polymer composition has density from 0.860 to 0.920 g/cc, or from 0.860 to 0.910 g/cc, or from 0.860 to 0.900 g/cc, or from 0.860 to 0.890 g/cc (1 cc=1 cm$^3$). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

Ethylene/α-Olefin/Non-Conjugated Polyenes Interpolymers

The ethylene/α-olefin/non-conjugated polyene interpolymers (including the second ethylene/α-olefin/non-conjugated polyene interpolymers), for the polymer compositions described herein, comprise, in polymerize form, ethylene, an α-olefin, and a non-conjugated polyene. Suitable examples of α-olefins include the C3-C20 α-olefins, further C3-C10 α-olefins, and preferably propylene. Suitable examples of non-conjugated polyenes include the C4-C40 non-conjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/-diene (EPDM) terpolymer. In a further embodiment, the diene is 5-ethylidene-2-norbornene (ENB).

Illustrative non-conjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a non-conjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/non-conjugated polyene interpolymer comprises a majority amount of polymerized ethylene, based on the weight of the interpolymer. In a further embodiment, the ethylene/α-olefin/non-conjugated polyene interpolymer is an ethylene/α-olefin/diene interpolymer. In a further embodiment, the interpolymer is an EPDM. In a further embodiment, the diene is ENB.

In one embodiment, the second ethylene/α-olefin/non-conjugated polyene interpolymer comprises a majority amount of polymerized ethylene, based on the weight of the interpolymer. In a further embodiment, the second ethylene/α-olefin/non-conjugated polyene interpolymer is an ethylene/α-olefin/diene interpolymer. In a further embodiment, the second interpolymer is an EPDM. In a further embodiment, the diene is ENB In one embodiment, the ethylene/α-olefin/non-conjugated polyene interpolymer has a molecular weight distribution (Mw/Mn) from 1.8 to 3.50, or from 1.85 to 3.20, or from 1.90 to 3.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is EN B.

In one embodiment, the second ethylene/α-olefin/non-conjugated polyene interpolymer has a molecular weight distribution (Mw/Mn) from 1.8 to 3.50, or from 1.85 to 3.20, or from 1.90 to 3.00. In a further embodiment, the second ethylene/α-olefin/non-conjugated polyene interpolymer is an ethylene/α-olefin/diene interpolymner (EAODM). In a further embodiment, the second interpolymer is an EPDM. In a further embodiment, the diene is ENB.

In one embodiment, the ethylene/α-olefin/non-conjugated polyene interpolymer has a Mooney viscosity, ML(i+4) at 125° C., greater than, or equal to, 70, further greater than, or equal to, 75, further greater than, or equal to 80. In a further embodiment, the ethylene/α-olefin/non-conjugated polyene interpolymer is an ethylene/α-olefin/diene interpolymer. In a further embodiment, the interpolymer is an EPDM. In a further embodiment, the diene is ENB.

In one embodiment, the ethylene/α-olefin/non-conjugated polyene interpolymer has a Mooney viscosity, ML(1+4) at 125° C., less than 120, or less than, or equal to, 110, or less than, or equal to, 100. In a further embodiment, the ethylene/α-olefin/non-conjugated polyene interpolymer is an ethylene/α-olefin/diene interpolymer. In a further embodiment, the interpolymer is an EPDM. In a further embodiment, the diene is ENB.

Mooney viscosity is that of the neat interpolymer. The neat interpolymer refers to the interpolymer without filler and without oil.

In one embodiment, the ethylene/α-olefin/non-conjugated polyene interpolymer has density from 0.860 to 0.920 g/cc, or from 0.860 to 0.910 g/cc, or from 0.860 to 0.900 g/cc, or 0.860 to 0.890 g/cc (1 cc=1 cm$^3$). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the second ethylene/α-olefin/non-conjugated polyene interpolymer has density from 0.860 to 0.920 g/cc, or from 0.860 to 0.910 g/cc, or from 0.860 to 0.900 g/cc, or from 0.860 to 0.890 g/cc (1 cc=1 cm$^3$). In a further embodiment, the second ethylene/α-olefin/non-conjugated polyene interpolymer is an ethylene/α-olefin/diene interpolymer (EAODM). In a further embodiment, the interpolymer is an EPDM. In a further embodiment, the diene is ENB.

An ethylene/alpha-olefin/non-conjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

Compositions and Applications

The invention also provides a composition comprising the polymer composition formed by an inventive process.

The composition may comprise a combination of two or more embodiments as described herein.

An inventive composition may comprise one or more additional additives. Suitable additives include, but are not limited to, fillers, antioxidants, UV stabilizers, flame retardants, colorants or pigments, crosslinking agents, and combinations thereof.

In one embodiment, the composition further comprises a crosslinking agent. Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; and peroxides, such as di-tertbutyl peroxide, tertbutylcumyl peroxide, dicumyl peroxide, 2,5-dimethyl-2, 5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane.

The invention also provides a crosslinked composition formed from an inventive composition of one or more embodiments described herein In one embodiment, the composition further comprises an oil. Oils include, but are not limited to, petroleum oils, such as aromatic and naphthenic oils; polyalkylbenzene oils; and organic acid monoesters.

In one embodiment, an inventive composition further comprises a filler. Suitable fillers include, but are not limited to, clay, CaCO3, talc, carbon black, and mineral fibers.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HD-PE), linear low density polyethylene (LLDPE), very low density polyethylene (VLDPE), ultra low density polyethylene (ULDPE), homogeneously branched linear ethylene/α-olefin interpolymers, and homogeneously branched substantially linear ethylene/α-olefin interpolymers (that is homogeneously branched long chain branched ethylene/α-olefin interpolymers).

In one embodiment, the composition comprises greater than, or equal to, 90 weight percent, or greater than, or equal to, 95 weight percent, or greater than, or equal to, 99 weight percent, of the polymer composition, based on the weight of the composition. In a further embodiment, the polymer composition comprises greater than, or equal to, 90 weight percent, or greater than, or equal to, 95 weight percent, or greater than, or equal to, 98 weight percent, of the ethylene/alpha-olefin/non-conjugated polyene interpolymer or the sum of this interpolymer and a second ethylene/alpha-olefin/non-conjugated polyene interpolymer, each based on the weight of the polymer composition. In a further embodiment, each ethylene/α-olefin/non-conjugated polyene interpolymer is an ethylene/α-olefin/diene interpolymer (EAODM). In a further embodiment, each interpolymer is an EPDM. In a further embodiment, the diene is ENB.

The invention also provides an article comprising at least one component formed from an inventive composition of one or more embodiments described herein. Articles include, but are not limited to, sheets, foams, molded goods, and extruded parts. Additional articles include automotive parts, weather strips, belts, hoses, wire and cable jacketing, flooring materials, gaskets, tires, computer parts, building materials and footwear components. A skilled artisan can readily augment this list without undue experimentation. In one embodiment, the article is an automotive part.

An inventive article may comprise a combination of two or more embodiments described herein.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer composition," as used herein, includes the material(s), which comprise the polymer composition, as well as reaction products and decomposition products formed from the materials of the polymer composition. Any reaction product or decomposition product is typically present in trace or residual amounts. The polymer composition may contain, for example, one ethylene/α-olefin/non-conjugated polyene interpolymer, or may contain one such interpolymer and one or more additives. The polymer composition may contain two or more different ethylene/α-olefin/non-conjugated polyene interpolymers, or may contain such interpolymers and one or more additives.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/non-conjugated polyene interpolymer," as used herein, refers to a polymer that comprises, in polymerized form, ethylene, an α-olefin, and a non-conjugated polyene. In one embodiment, the "ethylene/α-olefin/non-conjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples for density measurements were prepared according to ASTM 1) 4703-10 (Method B, 15° C. per minute cooling). Approximately 7 g of sample was placed in a "2"×2"×135 mil thick" mold, and this was pressed at 374° F. (190° C.) for six minutes at 3,000 lb$_f$. Then the pressure was increased to 30,000 lb$_f$ for four minutes. This was followed by cooling at 15° C. per minute, at 30,000 lb$_f$, to approximately a temperature of 40° C. The "2"×2"×135 mil" polymer sample (plaque) was then removed from the mold, and three samples were cut from the plaque with a ½"×1" die cutter. Density measurements were made within one hour of sample pressing, using ASTM D792-13, Method B. Density was reported as an average of three measurements.

Melt Index

Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D) 1238, Condition 190° C./i 0 kg, and is reported in grams eluted per 10 minutes.

Conventional Gel Permeation Chromatography (Conv. GPC)

A GPC-IR high temperature chromatographic system from, PolymerChAR (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChAR Instrument-Control software and data collection interface. The system was equipped with an on-line, solvent degas device and pumping system from Agilent Technologies (Santa Clara, Calif.).

Injection temperature was controlled at 150 degrees Celsius. The columns used were three 10-micron "Mixed-B" columns from Polymer Laboratories (Shropshire, UK). The solvent used was 1,2,4 trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was 200 microliters, and the flow rate was one milliliters/minute. The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Eqn. 1)}$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(\text{conv gpc}) = \frac{\sum_{i=RV \text{ integration start}}^{i=RV \text{ integration end}} (IR_{measurement\ channel_i})}{\sum_{i=RV \text{ integration start}}^{i=RV \text{ integration end}} (IR_{measurement\ channel_i} / LogM_{PE_i})} \quad \text{(Eqn. 2)}$$

$$Mw(\text{conv gpc}) = \frac{\sum_{i=RV \text{ integration start}}^{i=RV \text{ integration end}} (LogM_{PE_i} IR_{measurement\ channel_i})}{\sum_{i=RV \text{ integration start}}^{i=RV \text{ integration end}} (IR_{measurement\ channel_i})} \quad \text{(Eqn. 3)}$$

$$Mz(\text{conv gpc}) = \frac{\sum_{i=RV \text{ integration start}}^{i=RV \text{ integration end}} (LogM_{PE_i}^2 IR_{measurement\ channel_i})}{\sum_{i=RV \text{ integration start}}^{i=RV \text{ integration end}} (LogM_{PE_i} IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and Log $M_{PE}$ is the polyethylene-equivalent MW determined from Equation 1. Data calculation were performed using "GPC One software (version 2.013H)" from PolymerChar.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, tan delta, and phase angle were determined. Specimens for Dynamic Mechanical Spectroscopy were "25 mm diameter× 3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR") was recorded.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

13C NMR Method for EPDM Composition Analysis

The samples were prepared by adding approximately "2.6 g of a 50/50 mixture of tetrachloroethane-d2/orthodichlorobenzene containing 0.025M in chromium acetylacetonate (relaxation agent)" to "0.2 g sample" in a "10 mm" NMR tube. The samples were dissolved and homogenized by heating the tube and its contents to 150° C. The data were collected using a Bruker 400 MHz spectrometer, equipped with a Bruker Dual DUL high-temperature CryoProbe. The data was acquired using 160 scans per data file, a 6 second pulse repetition delay, with a sample temperature of 120° C. The acquisition was carried out using a spectral width of 25,000 Hz and a file size of 32K data points.

NMR spectral analyses of the composition of the examples were carried out using the following analysis method. Quantitation of monomers present in EPDM can be calculated using the following equations (1A through 9A).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2} \quad \text{Equation 1A}$$

$$molesENB = CH3(13.6 - 14.7\ ppm) \quad \text{Equation 2A}$$

$$molesP = CH3(19.5 - 22.0\ ppm) \quad \text{Equation 3A}$$

$$\text{mole }\%\text{ ethylene} = \frac{100*molesE}{molesE + molesP + molesENB} \quad \text{Equation 4A}$$

$$\text{mole }\%\text{ propylene} = \frac{100*molesP}{molesE + molesP + molesENB} \quad \text{Equation 5A}$$

$$\text{mole }\%\text{ ENB} = \frac{100*molesENB}{molesE + molesP + molesENB} \quad \text{Equation 6A}$$

$$\text{Wt }\%\text{ ethylene} = \frac{100*\text{mole }\%\ E*28}{\text{mole }\%\ E*28 + \text{mole }\%\ P*42 + \text{mole }\%\ ENB*120} \quad \text{Equation 7A}$$

$$\text{Wt }\%\text{ propylene} = \frac{100*\text{mole }\%\ P*42}{\text{mole }\%\ E*28 + \text{mole }\%\ P*42 + \text{mole }\%\ ENB*120} \quad \text{Equation 8A}$$

$$\text{Wt }\%\text{ ENB} = \frac{100*\text{mole }\%\ ENB*120}{\text{mole }\%\ E*28 + \text{mole }\%\ P*42 + \text{mole }\%\ ENB*120} \quad \text{Equation 9A}$$

Further NMR spectral analysis of some inventive interpolymers displays a peak area, from 21.3 ppm to 21.8 ppm (% PP Tacticity Marker), greater than 3.0% (further greater than 4.0%) of the total integral area from 19.5 ppm to 22.0 ppm. Similar spectral analysis of some comparative examples, show less than 3.0% of the total integral area from 19.5 ppm to 22.0 ppm (see Examples C and D). Spectral data are referenced to the EEE backbone at 30 ppm. Peak responses in this region have been typically related to differences in propylene tacticity incorporated into the polymer. A similar analysis can be done for another type of ethylene/α-olefin/non-conjugated polyene interpolymer.

Further NMR spectral analysis of some inventive EPDMs displayed a peak area (corresponding to $CH_3$ of the aliphatic chain end) from chemical shift region 14.0 to 14.3 ppm, which when the total integrated area (chemical shift region 1 to 55 ppm) is set to a value of 1000, integrates to a peak area greater than 0.5 (>0.5 chain ends per 1000 carbons, ACE). Similar spectral analysis of the comparative EPDMs showed less than 0.5 ACE or non detected of the total integral area from 10 to 55 ppm. Spectral data were referenced to the EEE backbone at 30 ppm. Peak responses in this region typically are related to differences in chain ends that have been incorporated into the EPDM. A similar analysis can be done for another type of ethylene/α-olefin/non-conjugated polyene interpolymer.

EXPERIMENTAL

The following examples illustrate the present invention but are not intended to limit the scope of the invention.

Preparation of
3,6-bis(1,1-dimethylethyl)-9H-carbazole

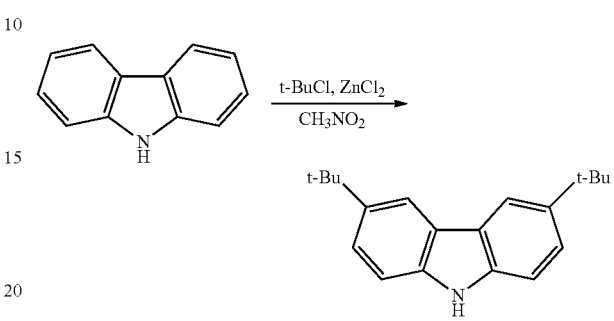

A 500 mL, three-necked round bottom flask, equipped with an overhead stirrer, nitrogen gas bubbler, and an addition funnel, was charged with 20.02 g (120.8 mmol) of carbazole, 49.82 g (365.5 mmol) of $ZnCl_2$, and 300 mL of nitromethane at room temperature. To the resulting dark brown slurry, was added, 49.82 g (365.5 mol) of 2-chloro-2-methylpropane (also known as tertiary-butyl chloride), dropwise from the addition funnel, over the period of 2.5 hours. After completing the addition, the resulting slurry was stirred for an additional 18 hours, and the reaction mixture was poured into 800 mL of ice cold water, and extracted with methylene chloride (3×500 mL). The combined extracts were dried with anhydrous magnesium sulfate, filtered, and concentrated, first by rotary evaporation, and then by evaporation under high vacuum to remove nitromethane. The resulting residue was dissolved in hot methylene chloride (70 mL), followed by hot hexanes (50 mL), and the resulting solution was cooled to room temperature, and then placed it in a refrigerator overnight. The resulting solids, which formed, were isolated, washed with cold hexanes, and then dried under high vacuum to yield 0.80 g (32.0%) of the desired product as off-white crystals.

$^1$H NMR (400 MHz, $CDCl_3$) δ 8.11 (d, J=1.6 Hz, 2H), 7.75 (s, 1H), 7.48 (dd, J=8.5, 1.9 Hz, 2H), 7.31 (d, J=8.5 Hz, 2H), 1.48 (s, 18H). $^{13}$C{$^1$H} NMR (101 MHz, $CDCl_3$) δ 142.17 (s), 137.96 (s), 123.45 (s), 123.28 (s), 116.11 (s), 109.97 (s), 34.73 (s), 32.09 (s).

Preparation of
2-iodo-4-(2,4,4-trimethylpentan-2-yl)phenol

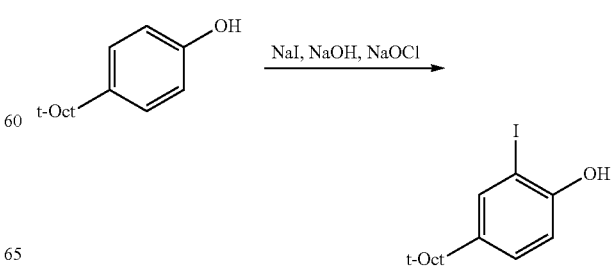

To a stirred solution of 10.30 g (60.00 mmol) of 4-(2,4,4-trimethylpentan-2-yl)phenol, in 125 mL of methanol, at 0° C., was added 7.48 g (50.00 mmol) of NaI and 2.00 g (50.0 mmol) of NaOH. To the resulting mixture, was added, 86 mL of 5% aqueous NaOCl solution (commercial bleach) over a one hour period. The resulting slurry was stirred for one more hour, at 0° C., then 30 mL of aqueous 10% $Na_2S_2O_3$ solution was added, and the resulting reaction mixture was acidified with the addition of dilute hydrochloric acid. The resulting mixture was extracted with methylene chloride, and the resulting organic layer was washed with brine, and then dried over anhydrous magnesium sulfate. The volatiles were removed under vacuum, and the resulting residue was purified by flash chromatography on silica gel, eluting with 5 volume percent (vol %) ethyl acetate in hexanes, to yield 11.00 g (66%) of the desired product, as a viscous oil. $^1$H NMR (CDCl$_3$) δ 7.60 (d, J=2.5 Hz, 1H), 7.25 (dd, J=8.5 and 2.2 Hz, 1H), 6.90 (d, J=8.5 Hz, 1H), 5.13 (s, 1H), 1.69 (s, 2H), 1.32 (s, 6H) and 0.74 (s, 9H). 13C{$^1$H}NMR (CDCl$_3$) δ 152.21, 144.52, 135.56, 128.03, 114.17, 85.36, 56.92, 38.01, 32.43, 31.90 and 31.64. GC/MS (m/e): 332 (M$^+$).

Preparation of 2-(2-iodo-4-(2,4,4-trimethylpentan-2-yl)phenoxy)tetrahydro-2H-pyran

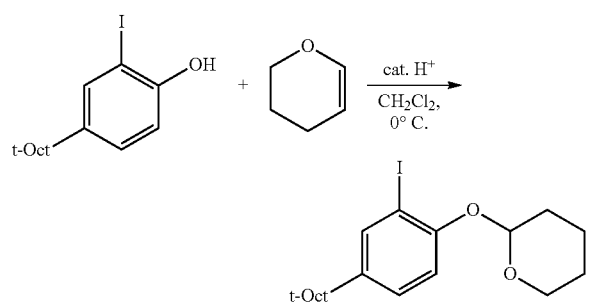

To a stirred solution of 4.91 g (14.8 mmol) of 4-(2,4,4-trimethylpentan-2-yl)phenol and 1.50 g (17.8 mmol) of 3,4-dihydropyran, in 5 mL of methylene chloride, at 0° C., was added, 0.039 g (0.205 mmol) of para-toluenesulfonic acid monohydrate. The resulting solution was allowed to warm to room temperature, and stirred there-at for approximately 10 minutes. Then triethylamine (0.018 g, 0.178 mmol) was added, and the resulting mixture was diluted with 50 mL of methylene chloride, and successively washed with 50 mL each of IM NaOH, water, and brine. The organic phase was dried with anhydrous magnesium sulfate, filtered, and concentrated, to give a crude material, which was purified by flash chromatography on silica gel, using 5 vol % ethyl acetate in hexanes, to yield 5.18 g (93.12%) of the desired product, as a golden oil. $^1$H NMR (CDCl$_3$) δ 7.74 (d, J=2.3 Hz, 1H), 7.27 (dd, J=2.3 and 8.6 Hz, 1H), 6.99 (d, J=8.6 Hz, 1H), 5.49 (m, 1H), 3.91 (m, 1H), 3.61 (m, 1H), 2.20-1.60 (m, 6H), 1.69 (s, 2H), 1.34 (s, 6H) and 0.75 (s, 9H). $^{13}$C{$^1$H} NMR (CDCl$_3$) δ 153.27, 145.49, 136.98, 127.08, 114.44, 96.72, 87.09, 61.69, 56.91, 37.95, 32.33, 31.81, 31.52, 31.44, 30.26, 25.27, 18.36.

Preparation of 3,6-di-tert-butyl-9-(2-(tetrahydro-2H-pyran-2-yloxy-5-(2,4,4-trimethylpentan-2-yl)phenyl)-9H-carbazole

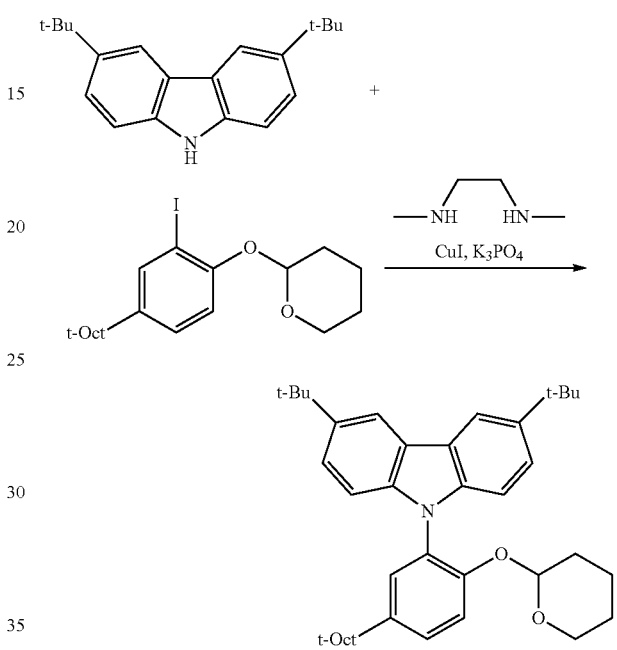

To a 50 mL, three necked, round bottom flask, equipped with a stir bar and condenser, under N$_2$ atmosphere, was added the following: 20 mL of dry toluene, 5.00 g (12.01 mmol) of 2-(2-iodo-4-(2,4,4-trimethylpentan-2-yl)phenoxy)tetrahydro-2H-pyran; 3.56 g (12.01 mmol) of 3,6-di-tert-butyl carbazole, 0.488 g (2.56 mmol) of CuI, 7.71 g (36.2 mmol) of K$_3$PO$_4$, and 0.338 g (3.84 mmol) of N,N'-dimethylethylenediamine. The resulting reaction mixture was heated, under reflux, for 48 hours, cooled, and filtered through a bed of silica gel. The silica gel was rinsed with tetrahydrofuran (THF), and the resulting solution was concentrated to give a crude residue. Purification was accomplished by recrystallization from acetonitrile, to yield 4.57 g (67.0%) of the desired product as a white solid. $^1$H NMR (CDCl$_3$) δ 8.13 (t, J=1.71 Hz, 1H), 7.48 (d, J=2.4 Hz, 1H), 7.40 (m, 3H), 7.31 (d, J=8.68 Hz, 1H), 7.14 (d, J=8.68 Hz, 1H), 7.08 (d, J=8.56 Hz, 1H), 5.22 (t, J=2.81 Hz, 1H), 3.72 (td, J=11.12 and 2.8 Hz, 1H), 3.47 (dt, J=11.12 and 3.47 Hz, 1H), 1.75 (s, 2H), 1.474 (s, 9H), 1.472 (s, 9H), 1.394 (s, 3H), 1.391 (s, 3H), 1.37-1.12 (m, 6H), 0.82 (s, 9H). $^{13}$C{$^1$H} NMR (CDCl$_3$) δ150.96, 144.22, 142.07, 140.02, 127.49, 126.60, 126.56, 123.14, 123.12, 122.96, 116.37, 115.88, 115.72, 110.18, 109.52, 97.02, 61.56, 57.03, 38.23, 34.69, 32.41, 32.07, 31.86, 31.72, 31.50, 29.98, 25.06, 17.61.

Preparation of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole Preparation of meso-4,4'-pentane-2,4-diylbis(oxy))bis(3-bromo-1-fluorobenzene)

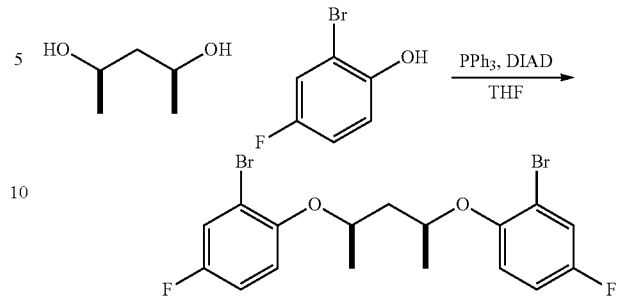

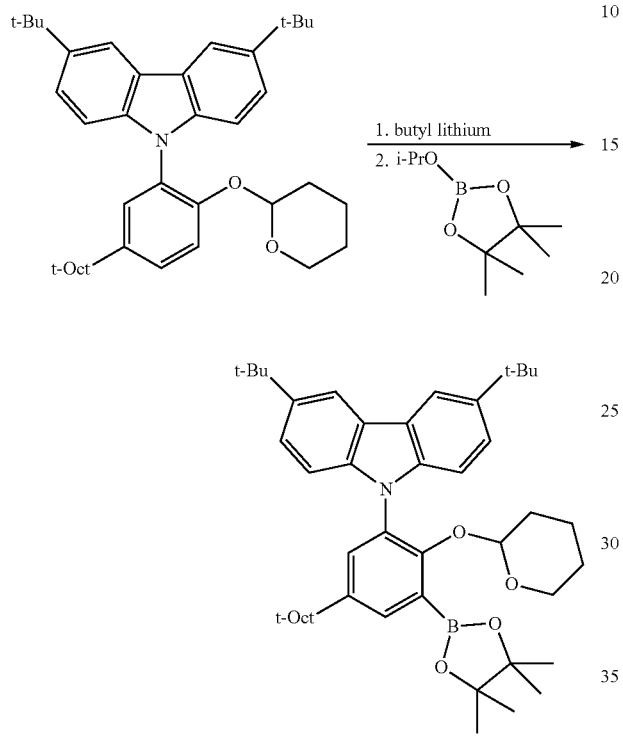

A 2-L, three-necked round bottom flask, equipped with a thermometer, a magnetic stirrer, an addition funnel, and a nitrogen pad, was charged with 2,4-pentanediol (30.46 g, 292.5 mmol, 1 equiv), 2-bromo-4-fluorophenol (114.39 g, 598.9 mmol, 2.04 equiv), triphenylphosphine (157.12 g, 599.0 mmol, 2.04 equiv), and THF (600 mL), and the contents cooled to 2° C. in an ice-water bath. A solution of DIAD (121.11 g, 598.9 mmol, 2.04 equiv) in THF (130 mL), in the addition funnel, was added, at such a rate, to maintain the reaction below 5° C. (the addition took approximately 4 h). The resulting mixture was stirred at 2° C. for an additional one hour, and a sample was taken for GC-MS analysis, which indicated the reaction was near to completion. After stirring overnight, at ambient temperature, volatiles were removed under reduced pressure. Cyclohexane (700 mL) was added to the residue and the slurry was stirred at room temperature for 30 minutes. The insoluble solid was filtered, rinsed with cyclohexane (100 mL×3). The cyclohexane solution was washed with 1N NaOH (200 mL), water (200 mL), 1N HCl (200 mL), water (500 mL×2), and then concentrated, under reduced pressure, to give an oil residue. The oil residue was dissolved in hexane (100 mL), and then passed through a pad of silica gel (315 g), eluting with hexane (300 mL), and Hexane-EtOAc (20:1 in volume, hexane 2 L+EtOAc 100 mL), concentrated, and dried, to give the desired bottom group (123.8 grams, 94% yield). $^1$H NMR (400 MHz, C$_6$D$_6$) δ 7.14 (dd, J=8.4, 3.9 Hz, 2H), 6.64 (dt, J=9.1, 3.9 Hz, 2H), 6.48 (dd, J=9.0, 3.7 Hz, 2H), 4.22 (m, 2H), 2.17 (dt, J=13.6, 6.5 Hz, 1H), 1.45 (dt, J=13.6, 5.6 Hz, 1H), and 0.98 (d, J=6.1 Hz, 6H). $^{13}$C NMR (101 MHz, CDCl$_3$) δ 156.9 (d, J=235.8 Hz), 150.9 (d, J=2.8 Hz), 120.9 (d, J=25.8 Hz), 115.62 (d, J=7.7 Hz), 114.9 (d, J=21.5 Hz), 113.7 (d, J=10.1 Hz), 72.8, 42.7, and 19.6. $^{19}$F NMR (376 MHz, C$_6$D$_6$) δ−121.33.

To a stirred solution of 2.5 g (4.4 mmol) of carbazole derivative, in 40 mL of THF, at 0° C., under nitrogen atmosphere, 2.8 mL (7.0 mmol) of n-butyl lithium (2.5 M solution in hexanes) was added, over a period of 5 minutes. The solution was stirred at 0° C. for three more hours. 2-Isopropoxy-4,4,5,5-tetramethyl-1,3,2-dioxaborolane (1.44 mL, 7.0 mmol) was added to this, and the stirring continued at 0° C. for one more hour. The reaction mixture was slowly warmed to room temperature, and stirred for 18 hours. The reaction mixture was concentrated to dryness and by rotary evaporation, and 100 mL of ice cold water was added. The mixture was extracted with methylene chloride. The organic layer was washed with brine, and dried over anhydrous magnesium sulfate. Removal of the solvent, followed by recrystallization from acetonitrile, gave 2.4 g (78.6%) of titled product as white solid. $^1$H NMR (CDCl$_3$) δ 8.30-7.96 (m, 2H), 7.81 (d, J=2.5 Hz, 1H), 7.58-7.32 (m, 3H), 7.14 (d, J=8.6 Hz, 2H), 4.85 (d, J=2.8 Hz, 1H), 2.76 (td, J=11.0, 2.7 Hz, 1H), 2.59 (dd, J=7.9, 3.5 Hz, 1H), 1.73 (s, 2H), 1.67-0.87 (m, 6H), 1.46 (s, 9H), 1.45 (s, 9H), 1.38 (s, 9H), 1.37 (s, 9H), 0.78 (s, 9H); $^{13}$C{$^1$H} NMR (CDCl$_3$) δ 156.25, 145.86, 142.05, 142.01, 139.79, 139.78, 133.82, 130.61, 129.72, 123.39, 123.37, 123.05, 115.59, 115.55, 110.20, 110.11, 101.41, 83.64, 61.20, 56.95, 38.37, 34.68, 32.42, 32.08, 31.90, 31.45, 29.97, 25.06, 25.04, 24.79, 18.16. MS m/e 716.38 (M+Na).

Preparation of Ligand

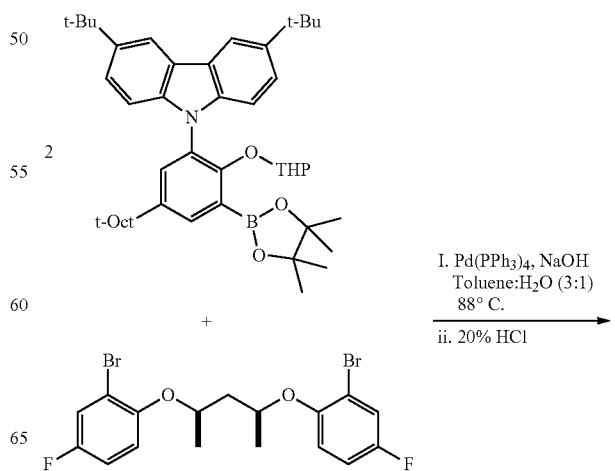

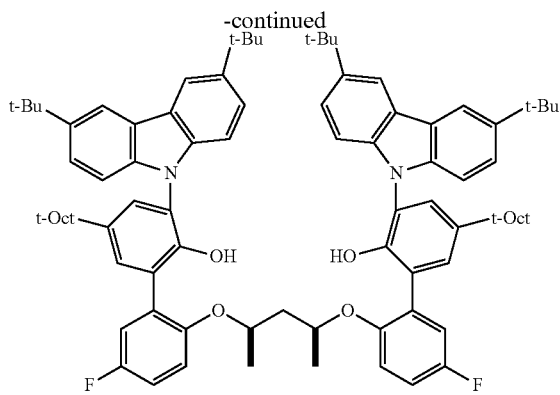

Method 1:

To a 2 L reactor vessel was added meso-4,4'-pentane-2,4-diylbis(oxy))bis(3-bromo-1-fluorobenzene) (80 g, 177.7 mmol) and 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (271.3 g, 391.0 mmol) dissolved in 800 mL of toluene, under a nitrogen atmosphere, with stirring. To this was added NaOH (42.7 g dissolved in 100 mL of water, 1.0 mol), followed by quick addition of Pd(PPh$_3$)$_4$ (8.21 g, 7.11 mmol), and the reaction heated to 88° C. The course of the reaction was monitored via LC, until deemed complete at the five hour mark. At this point, the reaction vessel was cooled to rt (room temperature), the caustic layer removed, and 200 mL of a 20% HCl solution was added, and the reaction heated once more to 88° C. for five hours. The reactor was cooled to ambient temperature, the aqueous layer removed, and the organic layer washed with brine, and dried over MgSO$_4$. Filtration to remove the MgSO$_4$, followed by concentration via rotary evaporation, gave an off-white solid, which was washed with acetonitrile, and the remaining solid dried under vacuum to provide pure ligand complex (199.5 grams, 89% yield).

Method 2 (Two Step Procedure)

Ph$_3$P (1.05 g, 4 mmol), meso-4,4'-pentane-2,4-diylbis(oxy))bis(3-bromo-1-fluorobenzene) (45.01 g, 100.0 mmol), aliquot 336 (0.326 g) and toluene (500 mL) were added into a 2 L three-necked round bottom flask, equipped with cold water condenser, magnetic stirrer, a thermometer, and a nitrogen pad in an oil bath. The mixture was sparged with nitrogen for 30 minutes. Pd(OAc)$_2$ (449.02 mg, 2.0 mmol, 0.02 equiv) was added, and the mixture was stirred for 5-10 minutes, until solid Pd(OAc)$_2$ dissolved, while sparging with nitrogen. Then 2N NaOH (300 mL, pre-sparged with nitrogen) was added, under nitrogen, and the mixture was sparged with nitrogen for five minutes. The reaction mixture was heated to 75-78° C., and a solution of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (156.64 g, 220 mmol), in 400 mL of toluene (sparged with nitrogen for 30 min), was added, over three hours, via a syringe pump. The reaction mixture was heated at 80-86° C. overnight (the reaction was complete over 4-6 h as monitored by LC), under nitrogen atmosphere, in a 105° C. oil bath, which resulted in a dark mixture. After being cooled to 50° C., air was bubbled into the reaction mixture for one hour to destroy the catalyst. The reaction mixture was then settled for phase-cut. The bottom aqueous layer was removed, and extracted with toluene (100 mL). The toluene phase was washed with water (500 mL×2). Next, 2N HCl (300 mL, prepared from 100 mL 6N HCl+200 mL H$_2$O) was added to the toluene solution. The resulting mixture was stirred 80-86° C., in a 105-108° C. oil bath, under nitrogen overnight.

LC analysis of the reaction mixture indicated that the deprotection of the THP group was complete. The reaction mixture was allowed to cool to ambient temperature. The bottom aqueous layer was removed, which was subsequently extracted with toluene (100 mL). The yellow to brown toluene phase was washed with water (500 mL×2). The toluene solution was filtered through a pad of silica gel (60-100 g). The silica gel wet cake was rinsed with toluene (100 mL). The slightly yellow toluene solution was concentrated, under reduced pressure, by rotovap, which gave a thick residue (~185.5 g). Acetonitrile (500 mL) was added to the residue, and the mixture was spun on roto-vap at 60° C. The thick residue was gradually dissolved, forming a clear slightly yellow solution. White solid precipitated out from the solution after a while. After cooling to ambient temperature overnight, the solid was collected by filtration, washed/rinsed with acetonitrile (200 mL×2), suck-dried, and dried in vacuum oven, to give the desired product (115.5 grams, 92.0% yield).

$^1$H NMR (400 MHz, C$_6$D$_6$) δ 8.45 (t, J=2.4 Hz, 4H), 7.50-7.56 (m, 6H), 7.41 (d, J=8.8 Hz, 2H), 7.16 (obscured by CD$_5$H), 6.32 (s, 2H), 6.30 (dd, J=9.3, 4.7 Hz, 2H), 6.23 (s, 2H), 4.16 (m, 2H), 2.01 (dt, J=14.3, 6.9 Hz, 1H), 1.55 (s, 4H), 1.37 (dt, J=14.2, 5.0 Hz, 1H), 1.44 (s, 18H), 1.43 (s, 18H), 1.20 (s, 12H), 0.83 (d, J=6.0 Hz, 6H), and 0.80 (s, 18H). $^{13}$C{$^1$H} NMR (101 MHz, C$_6$D$_6$) δ 158.2 (d, J=241.2 Hz), 149.8 (d, J=1.7 Hz), 148.9, 143.2, 143.0, 143.0, 140.7 (d, J=5.5 Hz), 131.1 (d, J=7.5 Hz), 129.4, 127.2, 126.1, 124.2 (d, J=2.7 Hz), 118.9 (d, J=23.4 Hz), 117.3 (d, J=9.2 Hz), 116.8, 115.8 (d, J=22.8 Hz), 110.2 (d, J=10.0 Hz), 73.7, 57.1, 42.66, 38.3, 34.9, 32.5, 32.2, 32.1, 31.7, 31.6, and 19.5. $^{19}$F NMR (376 MHz, C$_6$D$_6$) δ−120.95.

Preparation of Pro-Catalyst (II)

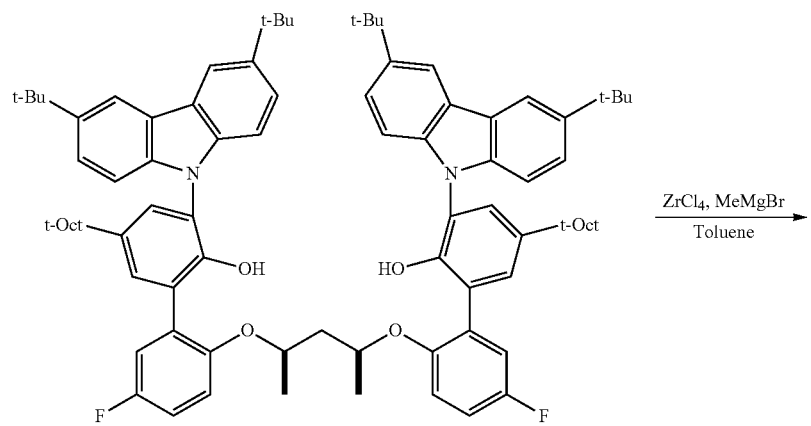

L3

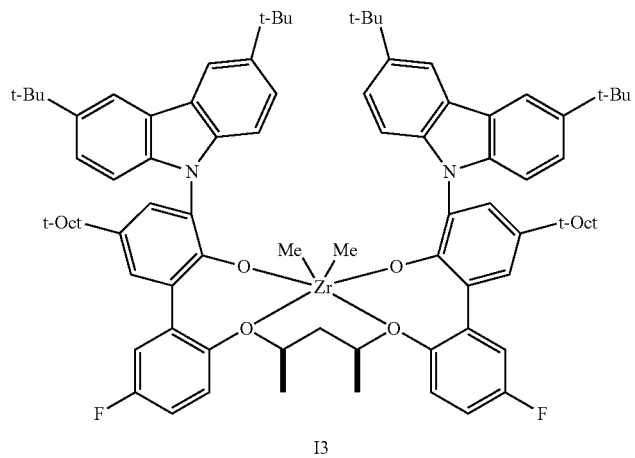

I3

A 5 L reactor was charged with 4.5 L of toluene and cooled to −30° C. To this, was added, ZrCl$_4$ (38.81 g, 166.8 mmol), followed by MeMgBr (211.8 mL of a 3M solution, 635.5 mmol). The resulting mixture was allowed to stir for five minutes, after which, the ligand L3 (199.5 g, 158.9 mmol) was added. The suspension was allowed to gradually warm to room temperature, and was stirred for an additional three hours, and then filtered. The toluene was then removed, under vacuum, to provide I3 as an off white solid in good purity (quantitative, 234 grams). $^1$H NMR (400 MHz, C$_6$D$_6$) δ 8.53 (m, 2H), 8.41 (dd, J=2.0, 12.0 Hz, 2H), 7.72 (m, 2H), 7.67 (d, J=3.0 Hz, 1H), 7.57-7.61 (m, 6H), 7.44 (ddd, J=2.9, 8.1, 9.4 Hz, 2H), 7.24 (dd, J=2.0, 14 Hz, 2H), 7.01 (dd, J=3.7, 8.9 Hz, 2H), 6.95 (dd, 4.0, 7.3 Hz, 1H), 6.60 (m, 2H), 4.95 (dd, J=4.4, 8.2 Hz, 2H), 4.82 (dd, J=4.4, 8.2 Hz, 2H), 4.21 (m, 2H), 3.78 (m, 2H), 1.64 (s, 3H), 1.58 (s, 3H), 1.48 (s, 9H), 1.46 (s, 9H), 1.32 (s, 9H), 1.30 (s, 9H), 0.77-0.90 (m, 8H), 1.20-1.28 (m, 8H), 0.60 (d, J=7.3 Hz, 3H), 0.41 (d, J=7.3 Hz, 3H), −0.72 (s, 3H), and −0.88 (s, 3H). $^{19}$F NMR (376 MHz, C$_6$D$_6$) δ-114.83.

In general, other inventive catalyst systems, comprising other metal-ligand complexes (of Formula 1), can be prepared analogously to I3 (shown above), by using different chemical precursors. Specifically, the ligands of the invention may be prepared using a variety of synthetic routes, depending on the variation desired in the ligand. In general, building blocks are prepared that are then linked together in the same sequence as is described for I3. Variations in the R group substituents can be introduced in the synthesis of the building blocks. Variations in the bridge can be introduced with the synthesis of the bridging group. There are several different ways to link the building blocks. In one embodiment, generally, each of the optionally substituted phenyl rings is prepared as a separate building block. The desired optionally substituted phenyls are then combined into bi-phenyl building blocks, which are then bridged together. In another embodiment, the optionally substituted phenyl building blocks are bridged together, and then additional optionally substituted phenyl building blocks are added to form the bridged bi-aryl structures. The starting materials or reagents used are generally commercially available, or are prepared via routine synthetic means. The formation of the "metal-ligand complex" from the ligand is typically done by reaction with a suitable metal precursor and/or a suitable alkylation agent, analogously to I3.

The metal ligand complexes and co-catalysts used in the polymerizations described below are listed below,

CAT 1

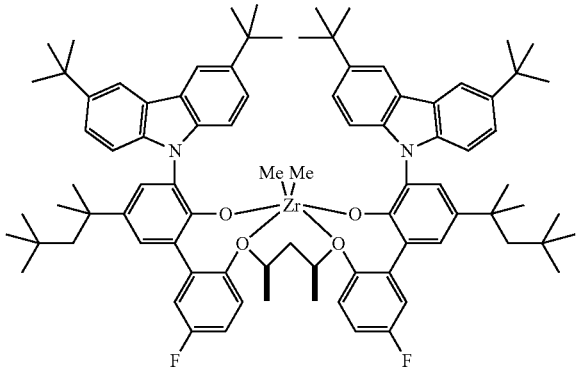

CAT A

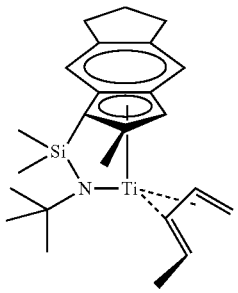

-continued

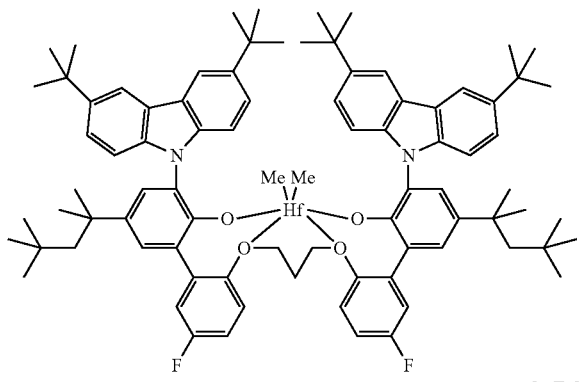

CAT B

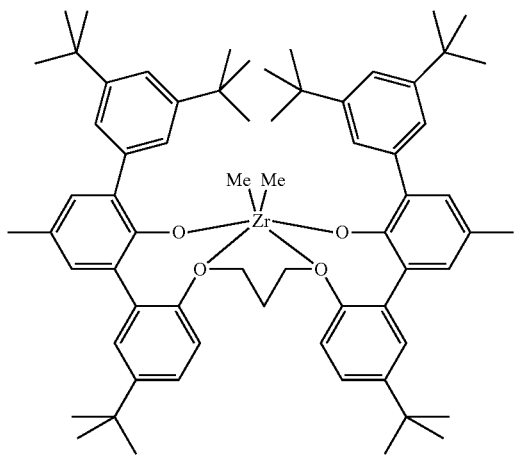

CAT C

Cocatalyst-1 was a mixture of methyldi($C_{14}$-18 alkyl) ammonium salts of tetrakis(pentafluorophenyl)borate, prepared by reaction of a long chain trialkylamine (ARMEEN M2HT, available from Akzo-Nobel, Inc.), HCl and Li[B (C6F5)4], substantially as disclosed in U.S. Pat. No. 5,919, 988 (Ex. 2). Cocatalyst-1 was purchased from Boulder Scientific, and used without further purification.

Cocatalyst-2 (modified methylalumoxane (MMAO)) was purchased from Akzo Nobel, and used without further purification.

Continuous Polymerizations

It is desirable to produce the inventive polymer under the conditions as explained in U.S. Pat. Nos. 5,977,251 and 6,545,088. The polymer products were produced in a solution polymerization process using a continuously mixed loop reactor. Ethylene was introduced in a mixture of a solvent of ISOPAR E (a mixture of C8-C10 saturated hydrocarbons available from ExxonMobil), propylene and 5-ethylidene-2-norbornene (ENB), forming the reactor feed stream. Catalyst was fed to the reactor separately, and activated in-situ, using co-catalyst 1 and co-catalyst 2. The outlet of the reactor was consequently a mixture of polymer, solvent, and reduced levels of the initial monomer streams. The molecular weight of the polymer may be controlled by adjusting reactor temperature, monomer conversion, and/or the addition of a chain terminating agent, such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate.

Tables 1-4 list reaction conditions used to produce the inventive and comparative EPDM polymerizations. The EPDM polymers were prepared using a single reactor loop or CSTR or two consecutive reactors (with the option of first reactor: loop, second (final) reactor: loop; or first reactor: loop, second (final) reactor: CSTR); or first reactor: CSTR, second (final) reactor: loop). The reactor configuration used for each example is listed in Table 1.

Examples designated with "R1" are polymer samples from the first, single reactor, which were collected and subsequently dried in-vacuo to recover the EPDM polymer. Other polymer examples were prepared in two reactors in series, and for each case, polymer produced in the first reactor was transferred to the second reactor, and the final EPDM polymers were collected from the single operation, in which polymer was passed through the back-end operation and pelletized.

Polymerization conditions are shown in Tables 1-4 and polymer properties are shown in Tables 5-7.

TABLE 1

(EPDM inventive (1-11) and comparative (A-D) polymerizations)

| Ex. | Reactor Temp. [deg C.] | | Pressure [psig] | | Solvent Feed [lb/hr] | | Reactor Configuration | |
|---|---|---|---|---|---|---|---|---|
| | Rx1 | Rx2 | Rx1 | Rx2 | Rx1 | Rx2 | Rx1 | Rx2 |
| 1 | 137.5 | NA | 577.4 | NA | 152.3 | NA | Loop | NA |
| 2 | 138.0 | 151.61 | 573.8 | 582.0 | 148.1 | 289.3 | Loop | CSTR |
| 3 | 139.0 | NA | 574.2 | NA | 154.4 | NA | Loop | NA |
| 4 | 139.0 | 151.31 | 575.1 | 586.8 | 149.5 | 299.2 | Loop | CSTR |
| A | 150.9 | NA | 576.6 | NA | 153.2 | NA | Loop | NA |
| 5 | 150.9 | 149.02 | 575.6 | 581.7 | 153.9 | 322.8 | Loop | NA |
| 6 | 128.7 | NA | 574.1 | NA | 95.1 | NA | Loop | NA |
| 7 | 137.5 | NA | 573.7 | NA | 96.7 | NA | Loop | NA |
| 8 | 137.4 | 134.09 | 575.1 | 582.1 | 96.1 | 160.4 | Loop | CSTR |
| 9 | 137.5 | NA | 577.8 | NA | 99.9 | NA | Loop | NA |
| 10 | 137.5 | 134.1 | 576.1 | 582.6 | 99.6 | 153.6 | Loop | CSTR |
| 11 | 301.2 | NA | 656.7 | NA | 181.7 | NA | Loop | NA |
| B | 120.0 | NA | 625.5 | NA | 172.0 | NA | Loop | NA |
| C | 112 | NA | — | NA | — | NA | Loop | NA |
| D | 88.2 | NA | — | NA | — | NA | Loop | NA |

Rx1 = first reactor,
Rx2 = second reactor,
NA = Not Applicable

TABLE 2

(EPDM inventive (1-13) and comparative (A-D) polymerizations)

| Ex. | Ethylene Feed [lb/hr] Rx1 | Ethylene Feed [lb/hr] Rx2 | Propylene Feed [lb/hr] Rx1 | Propylene Feed [lb/hr] Rx2 | ENB Feed [lb/hr] Rx1 | ENB Feed [lb/hr] Rx2 | Exit Ethylene [lb/hr] Rx1 | Exit Ethylene [lb/hr] Rx2** | C2 Conversion* (wt %) Rx1 | C2 Conversion* (wt %) Rx2 |
|---|---|---|---|---|---|---|---|---|---|---|
| 1 | 23.78 | NA | 14.39 | NA | 2.86 | NA | 4.57 | | 80.8 | NA |
| 2 | 23.83 | 32.42 | 14.05 | 9.08 | 2.84 | 3.13 | 4.65 | 7.75 | 80.5 | 79.08 |
| 3 | 21.92 | NA | 13.55 | NA | 2.27 | NA | 2.78 | | 87.3 | NA |
| 4 | 21.88 | 34.62 | 13.42 | 18.67 | 2.32 | 3.64 | 2.80 | 7.96 | 87.2 | 78.74 |
| A | 20.96 | NA | 12.84 | NA | 1.99 | NA | 1.93 | | 90.8 | NA |
| 5 | 20.95 | 35.89 | 12.82 | 23.58 | 2.03 | 3.94 | 1.86 | 8.66 | 91.1 | 77.06 |
| 6 | 9.36 | NA | 20.65 | NA | 1.88 | NA | 2.44 | | 73.9 | NA |
| 7 | 9.38 | NA | 19.17 | NA | 1.27 | NA | 1.82 | | 80.6 | NA |
| 8 | 9.41 | 13.22 | 18.66 | 21.62 | 1.28 | 2.39 | 1.81 | 5.42 | 80.8 | 63.9 |
| 9 | 8.88 | NA | 15.6 | NA | 1.24 | NA | 1.37 | | 84.6 | NA |
| 10 | 9.04 | 13.78 | 15.66 | 26.82 | 1.24 | 2.35 | 1.37 | 5.32 | 84.9 | 64.84 |
| 11 | 16.99 | NA | 18.12 | NA | 4.03 | NA | 8.14 | | 52.1 | NA |
| B | 25.49 | NA | 38.66 | NA | 2.7 | NA | 4.18 | | 83.6 | NA |
| C | — | NA | — | NA | — | NA | — | NA | 71.3 | NA |
| D | — | NA | — | NA | — | NA | — | NA | 73.8 | NA |

Rx1 = first reactor, Rx2 = second reactor, NA = Not Applicable $$\text{*Ethylene Conversion (\%)} = \frac{\text{Ethylene in Feed to Rx (lbs/hr)} - \text{Ethylene in Exit of Rx (lbs/hr)}}{\text{Ethylene in Feed to Rx (lbs/hr)}} * 100;$$

**The ethylene feed to the second reactor consists of ethylene in the feed stream plus the unreacted ethylene leaving the first reactor.

TABLE 3

(EPDM inventive (1-11) and comparative (A-D) polymerizations)

| Ex. | H2 (mol %) Rx1 | H2 (mol %) Rx2 | C2 Conc. [g/L] Rx1 | C2 Conc. [g/L] Rx2 | Catalyst* Efficiency [lb_poly/lb_metal] 10E6 Rx1 | Catalyst* Efficiency [lb_poly/lb_metal] 10E6 Rx2 | Catalyst* Flow [lb/hr] Rx1 | Catalyst* Flow [lb/hr] Rx2 | Catalyst Solution Conc. (ppm) Rx1 | Catalyst Solution Conc. (ppm) Rx2 |
|---|---|---|---|---|---|---|---|---|---|---|
| 1 | 0.09 | NA | 15.34 | NA | 1.83 | NA | 0.73 | NA | 19.9 | NA |
| 2 | 0.09 | 0.26 | 15.43 | 9.73 | 1.73 | 1.22 | 0.76 | 1.55 | 19.9 | 19.9 |
| 3 | 0.07 | NA | 9.39 | NA | 1.51 | NA | 0.92 | NA | 19.9 | NA |
| 4 | 0.07 | 0.19 | 9.46 | 9.58 | 1.16 | 1.15 | 1.18 | 1.79 | 19.9 | 19.9 |
| A | 0.03 | NA | 6.48 | NA | 0.32 | NA | 2.09 | NA | 39.92 | NA |
| 5 | 0.03 | 0.19 | 6.27 | 9.89 | 0.38 | 1.39 | 1.79 | 0.76 | 39.92 | 39.92 |
| 6 | 0.05 | NA | 12.17 | NA | 5.23 | NA | 0.63 | NA | 4.88 | NA |
| 7 | 0.04 | NA | 9.16 | NA | 1.35 | NA | 1.25 | NA | 9.89 | NA |
| 8 | 0.04 | 0.08 | 9.19 | 11.34 | 1.33 | 2.67 | 1.25 | 0.74 | 9.89 | 9.89 |
| 9 | 0.04 | NA | 7.04 | NA | 0.99 | NA | 1.6 | NA | 9.89 | NA |
| 10 | 0.04 | 0.06 | 6.94 | 11.09 | 0.97 | 2.33 | 1.66 | 0.9 | 9.89 | 9.89 |
| 11 | 0.04 | NA | 23.55 | NA | 0.91 | NA | 0.58 | NA | 29.91 | NA |
| B | 0.02 | NA | 11.67 | NA | 2.48 | NA | 0.53 | NA | 24.9 | NA |
| C | 0.41 | NA | — | NA | 1.72 | NA | — | NA | — | NA |
| D | 0.1 | NA | — | NA | 1.32 | NA | — | NA | — | NA |

Rx1 = first reactor,
Rx2 = second reactor,
NA = Not Applicable;
CAT 1 (Exs. 1-11, A),
CAT C (Ex. B),
CAT A (Exs. C and D)

TABLE 4

(EPDM inventive (1-11) and comparative (A-D) polymerizations)

| Ex. | Cocat-1 Flow [lb/hr] Rx1 | Cocat-1 Flow [lb/hr] Rx2 | Cocat-1 Solution Conc. [ppm] Rx1 | Cocat-1 Solution Conc. [ppm] Rx2 | Cocat-2 Flow [lb/hr] Rx1 | Cocat-2 Flow [lb/hr] Rx2 | Cocat-2 Solution Conc. [ppm] Rx1 | Cocat-2 Solution Conc. [ppm] Rx2 | Production Rate [lb/hr] Rx1 | Production Rate [lb/hr] Rx2 |
|---|---|---|---|---|---|---|---|---|---|---|
| 1 | 0.56 | NA | 349.6 | NA | 0.66 | NA | 97.65 | NA | 26.36 | NA |
| 2 | 0.58 | 1.18 | 349.6 | 349.6 | 0.7 | 0.72 | 97.65 | 97.65 | 26.22 | 37.67 |
| 3 | 0.7 | NA | 349.6 | NA | 0.84 | NA | 97.65 | NA | 27.44 | NA |
| 4 | 0.89 | 1.38 | 349.6 | 349.6 | 1.1 | 0.83 | 97.65 | 97.65 | 27.26 | 41.07 |
| A | 2.12 | NA | 524.4 | NA | 1.85 | NA | 195.31 | NA | 26.95 | NA |
| 5 | 1.82 | 0.77 | 524.4 | 524.4 | 1.66 | 0.35 | 195.31 | 195.31 | 27.12 | 41.98 |

TABLE 4-continued (EPDM inventive (1-11) and comparative (A-D) polymerizations)

| Ex. | Cocat-1 Flow [lb/hr] Rx1 | Cocat-1 Flow [lb/hr] Rx2 | Cocat-1 Solution Conc. [ppm] Rx1 | Cocat-1 Solution Conc. [ppm] Rx2 | Cocat-2 Flow [lb/hr] Rx1 | Cocat-2 Flow [lb/hr] Rx2 | Cocat-2 Solution Conc. [ppm] Rx1 | Cocat-2 Solution Conc. [ppm] Rx2 | Production Rate [lb/hr] Rx1 | Production Rate [lb/hr] Rx2 |
|---|---|---|---|---|---|---|---|---|---|---|
| 6 | 0.21 | NA | 174.8 | NA | 0.26 | NA | 195.31 | NA | 15.93 | NA |
| 7 | 0.94 | NA | 349.6 | NA | 0.4 | NA | 146.48 | NA | 16.66 | NA |
| 8 | 0.9 | 0.53 | 349.6 | 349.6 | 0.37 | 0.23 | 146.48 | 146.48 | 16.51 | 19.45 |
| 9 | 1.19 | NA | 349.6 | NA | 0.47 |  | 146.48 | NA | 15.73 | NA |
| 10 | 1.23 | 0.66 | 349.6 | NA | 0.5 | 0.26 | 146.48 | NA | 15.84 | 20.6 |
| 11 | 0.21 | NA | 819.31 | NA | 0.38 | NA | 273.43 | NA | 15.91 | NA |
| B | 0.54 | NA | 799.78 | NA | 1.07 | NA | 146.48 | NA | 33.1 | NA |
| C | — | NA | — | NA | — | NA | — | NA | 41.5% | NA |
| D | — | NA | — | NA | — | NA | — | NA | 45.8% | NA |

Rx1 = first reactor,
Rx2 = second reactor,
NA = Not Applicable

TABLE 5

(EPDM properties for inventive 1-5 and comparative A and C)

| | | Ex. 1 | Ex. 3 | Ex. A | Ex. C | Ex. 2 | Ex. 4 | Ex. 5 |
|---|---|---|---|---|---|---|---|---|
| Catalyst | | CAT 1 | CAT 1 | CAT 1 | CAT A | CAT 1 | CAT 1 | CAT 1 |
| Mooney Viscosity | MV | 88.8 | 85.8 | 109.0 | 97.8 | 26.2 | 24.1 | 27.9 |
| wt % C2 | wt % | 71.7 | 70.1 | | 70 | 73.2 | 71.3 | |
| wt % ENB | wt % | 5.1 | 4.9 | | 4.9 | 5.3 | 5.0 | |
| V0.1 | Pa·s | 67,036 | 85,661 | 213880 | 219,000 | 14955 | 14393 | 42830 |
| V0.1/V100 | | 14.6 | 20.6 | 55.2 | 42.4 | 3.7 | 8.9 | 23 |
| Tan Delta @ 0.1 rad/s | | 2.54 | 1.79 | 1.05 | 0.91 | 3.66 | 3.48 | 1.58 |
| Phase Angle | degrees | 68.5 | 60.8 | 46.5 | 42.2 | 74.72 | 73.98 | 57.6 |
| Mw | g/mol | 202,529 | 194,118 | 282,338 | 184,990 | 124,433 | 120,163 | 158,059 |
| Mw/Mn | | 2.16 | 2.16 | 2.27 | 2.06 | 2.85 | 2.69 | 3.07 |
| ACE δ14.0-14.3 ppm per 1000 C. | % | | 5.0 | | ND | | 2.6 | |
| % PP Tacticity Marker | % | | 6.1 | | 2.0 | | 20.7 | |
| Mw/V0.1 | (g/mol)/(Pa·s) | 3.02 | 2.27 | 1.32 | 0.84 | 8.32 | 8.35 | 3.69 |

TABLE 6

(EPDM properties for inventive 6-19 and comparative D)

| | | 6 | 7 | 9 | D | 8 | 10 |
|---|---|---|---|---|---|---|---|
| Catalyst | | CAT 1 | CAT 1 | CAT 1 | CAT A* | CAT 1 | CAT 1 |
| Mooney Viscosity | MV | 81.3 | 82.7 | 86.8 | 103 | 64.2 | 73.2 |
| wt % C2 | wt % | 45.6 | 46.3 | 47.1 | 50 | 49.7 | 49.4 |
| wt % ENB | wt % | 4.5 | 3.8 | 5.4 | 4.9 | 4.9 | 4.4 |
| V0.1 | Pa·s | 67,145 | 99,318 | 119,630 | 164,000 | 56,180 | 73,148 |
| V0.1/V100 | | 16.5 | 24.8 | 29.9 | 36.4 | 16 | 19.1 |
| Tan Delta @0.1 rad/s | | 2.69 | 1.85 | 1.57 | 1.18 | 2.4 | 2.11 |
| Phase Angle | degrees | 69.62 | 61.5 | 57.6 | 49.6 | 67.96 | 64.71 |
| Mw | g/mol | 211,888 | 244,210 | 243,214 | 212,820 | 194,084 | 209,069 |
| Mw/Mn | | 2.17 | 2.00 | 2.00 | 2.28 | 2.13 | 2.05 |
| ACE δ14.0-14.3 ppm per 1000 C. | % | | | | ND | | |
| % PP Tacticity Marker | % | | | | <3.0 | | |
| Mw/V0.1 | (g/mol)/(Pa·s) | 3.16 | 2.46 | 2.03 | 1.30 | 3.45 | 2.86 |

TABLE 7

(EPDM properties for inventive 11 and comparative B and E)

| | | 11 | B | E* |
|---|---|---|---|---|
| Catalyst | | CAT 1 | CAT C | CAT B |
| Reactor Config. | | Single CSTR | Single CSTR | Single CSTR |
| Mooney Viscosity | MV | 90 | 90 | — |
| wt % C2 | wt % | 70 | 70 | 65 |
| wt % ENB | wt % | 4.6 | 4.6 | 5.0 |
| V0.1 | Pa·s | 92,155 | 120,210 | 94,115 |
| V0.1/V100 | | 15.8 | 21.6 | 56.7 |
| Tan Delta @ 0.1 rad/s | | 2.26 | 1.62 | 0.95 |
| Phase Angle | degrees | 66.15 | 58.3 | 43.6 |
| Mw | g/mol | 180,739 | 180,200 | 370,106 |
| Mw/Mn | | 2.2 | 2.3 | 2.2 |
| % ACE δ14.0-14.3 ppm | % | 0.57 | — | — |
| % PP Tacticity Marker | % | 6.9 | 5.4 | — |
| Mw/V0.1 | (g/mol)/(Pa·s) | 1.96 | 1.50 | — |

*EPDM contains 50 wt % oil, based on weight of EPDM + oil.

As seen in Tables 5-6, the inventive processes (Exs. 1-11) produce high molecular weight (Mw, Mooney) EPDMs with low levels of long chain branching, as indicated, overall, by higher Mw/V0.1 values, higher tan delta values, and lower V0.1/V100 values, as compared to the comparative polymerizations (Exs. A-E).

The present invention may be embodied in other forms without departing from the spirit and the essential attributes thereof, and, accordingly, reference should be made to the appended claims, rather than to the foregoing specification, as indicating the scope of the invention.

The invention claimed is:

1. A process to form a polymer composition comprising at least one ethylene/α-olefin/non-conjugated polyene interpolymer, and wherein the polymer composition has at least the following properties:
   a) a Mw/V0.1 ratio greater than, or equal to, 1.80 (g/mol)/(Pa·s);
   said process comprising polymerizing one or more monomer(s) comprising ethylene, an α-olefin and a non-conjugated polyene, in the presence of a catalyst system comprising a metal-ligand complex of Formula (I):

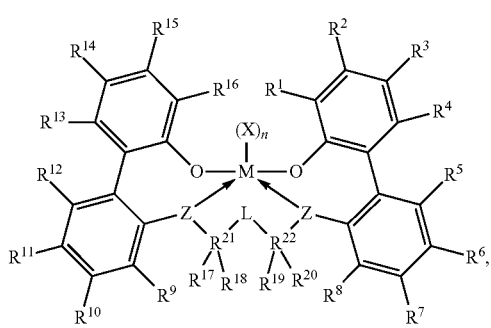

(Formula I)

wherein:
M is titanium, zirconium, or hafnium, each independently being in a formal oxidation state of +2, +3, or +4; and n is an integer of from 0 to 3, and wherein when n is 0, X is absent; and each X, independently, is a ($C_1$-$C_{40}$)hydrocarbyl, a ($C_1$-$C_{40}$)heterohydrocarbyl, or a halide, and wherein each X, independently, is a monodentate ligand that is neutral, monoanionic, or dianionic; or wherein two X's are taken together to form a bidentate ligand that is neutral, monoanionic, or dianionic; and wherein X and n are chosen, in such a way, that the metal-ligand complex of Formula I is, overall, neutral; and each Z independently is an oxygen atom, a sulfur atom, —N[($C_1$-$C_{40}$)hydrocarbyl]-, or —P[($C_1$-$C_{40}$)hydrocarbyl]-; and L is a substituted or unsubstituted ($C_1$-$C_{40}$)hydrocarbylene, or a substituted or unsubstituted ($C_1$-$C_{40}$)heterohydrocarbylene, and wherein, for L, the ($C_1$-$C_{40}$)hydrocarbylene has a portion that comprises a 1-carbon atom to 10-carbon atom linker backbone, linking $R^{21}$ and $R^{22}$ in Formula I (to which L is bonded), or wherein, for L, the ($C_1$-$C_{40}$)heterohydrocarbylene has a portion that comprises a 1-atom to 10-atom linker backbone linking $R^{21}$ and $R^{22}$ in Formula I, wherein each of the 1 to 10 atoms of the 1-atom to 10-atom linker backbone of the ($C_1$-$C_{40}$)heterohydrocarbylene, independently, is one of the following: i) a carbon atom, ii) a heteroatom, wherein each heteroatom independently is —O— or —S—, or iii) a substituent selected from —S(O)—, —S(O)$_2$—, —Si($R^C$)$_2$—, —Ge($R^C$)$_2$—, —P($R^C$), or —N($R^C$)—, and wherein each $R^C$ is, independently, a substituted or unsubstituted ($C_1$-$C_{30}$)hydrocarbyl, or a substituted or unsubstituted ($C_1$-$C_{30}$) heterohydrocarby; and $R^{21}$ and $R^{22}$ are each, independently, C or Si; and $R^1$ through $R^{20}$ are each, independently, selected from the group consisting of following: a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, a halogen atom, and a hydrogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; and wherein, when $R^{17}$ is a hydrogen atom, then $R^{18}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, or a halogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; or wherein, when $R^{18}$ is a hydrogen atom, then $R^{17}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, or a halogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; or wherein, when $R^{19}$ is a hydrogen atom, then $R^{20}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, or a halogen atom; and wherein each $R^C$ is independently a substituted or unsubstituted ($C_1$-$C_{30}$)hydrocarbyl, or a substituted or unsubstituted ($C_1$-$C_{30}$) heterohydrocarbyl; or wherein, when $R^{20}$ is a hydrogen atom, then $R^{19}$ is a substituted or unsubstituted ($C_1$-$C_{40}$)hydrocarbyl, a substituted or unsubstituted ($C_1$-$C_{40}$)heterohydrocarbyl, —Si($R^C$)$_3$, —Ge($R^C$)$_3$, or a halogen atom; and wherein each $R^C$ is independently a substituted or unsubstituted $(C_1-C_{30})$hydrocarbyl, or a substituted or unsubstituted $(C_1-C_{30})$ heterohydrocarbyl; and wherein, for Formula I, two or more of $R^1$ through $R^{22}$, optionally, form one or more ring structures, and wherein each ring structure has from 3 to 50 atoms in the ring, excluding any hydrogen atoms.

2. The process of claim 1, wherein the polymer composition has a tan delta (0.1 rad/sec, 190° C.) greater than, or equal to, 1.50.

3. The process of claim 1, wherein the process comprises polymerizing the one or more mixture(s) in one or more reactor(s), and wherein the reactor temperature in at least one reactor is less than 150° C.

4. The process of claim 1, wherein the polymer composition has molecular weight distribution (MWD) from 1.80 to 3.50.

5. The process of claim 1, wherein the process comprises polymerizing the one or more mixture(s) in one reactor or in two reactors.

6. The process of claim 1, wherein the polymer composition comprises two ethylene/α-olefin/non-conjugated polyene interpolymers.

7. The process of claim 1, wherein for Formula I, each Z is an oxygen atom.

8. The process of claim 1, wherein for Formula I, $R^{21}$ and $R^{22}$ are each C (carbon).

9. The process of claim 1, wherein for Formula I, L is selected from the following: —CH2CH2CH2-, —CH2CH2- or —CH2-.

10. The process of claim 1, wherein for Formula I, M is zirconium.

11. The process of claim 1, wherein for Formula I, $R^1$ and $R^{16}$ are each independently selected from the following i) through vii):

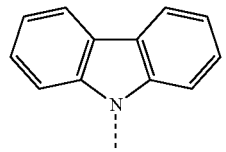

i)

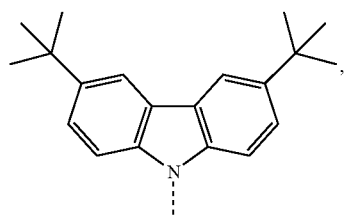

ii)

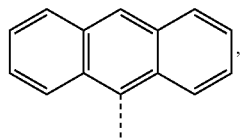

iii)

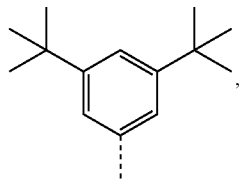

iv)

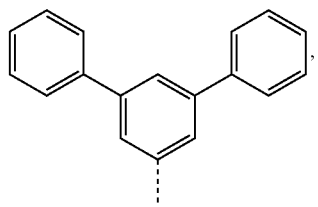

v)

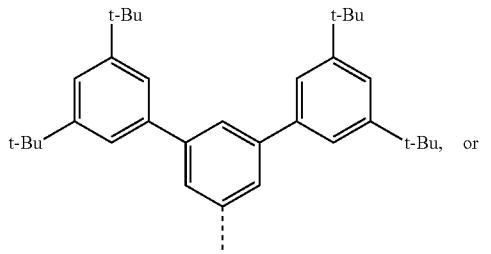

vi)

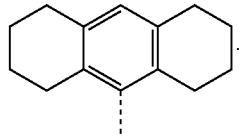

vii)

12. The process of claim 1, wherein Formula I is selected from the following I1 through I12:

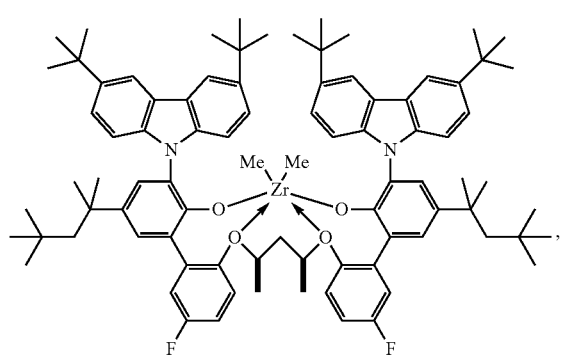

I1

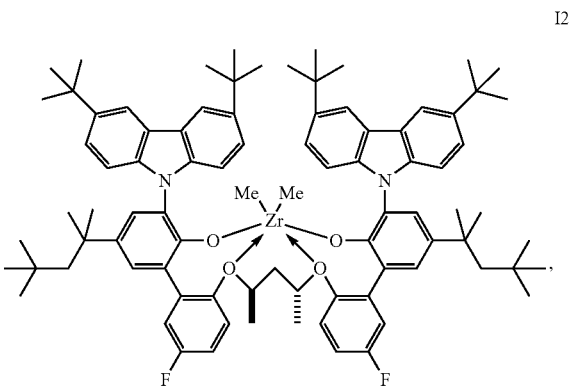

I2

-continued
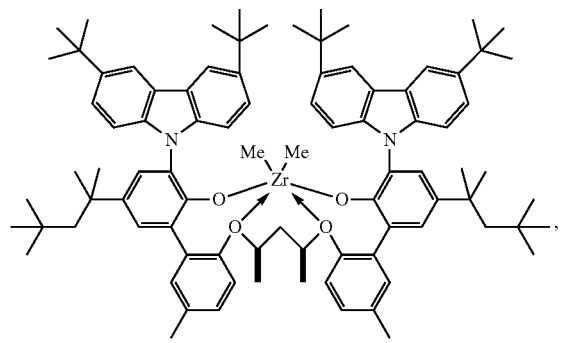
I3
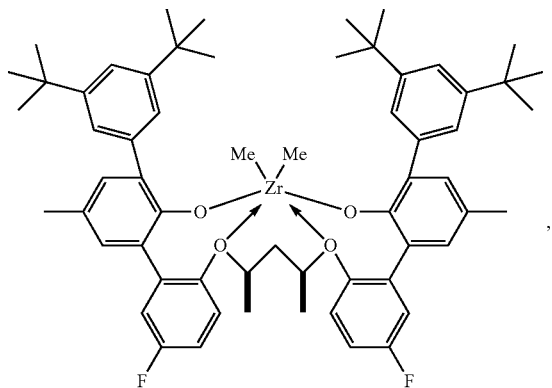
I4
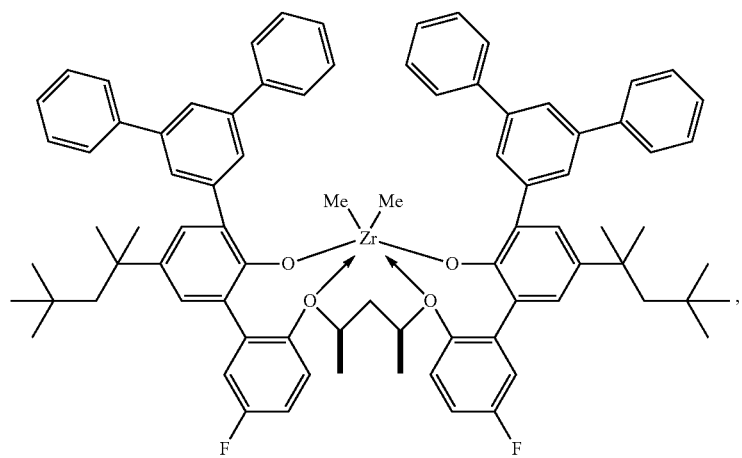
I5
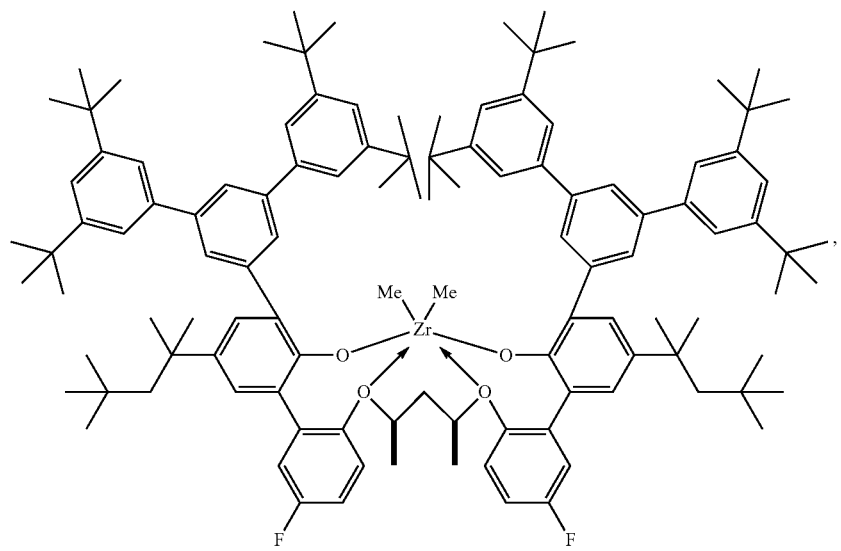
I6

-continued
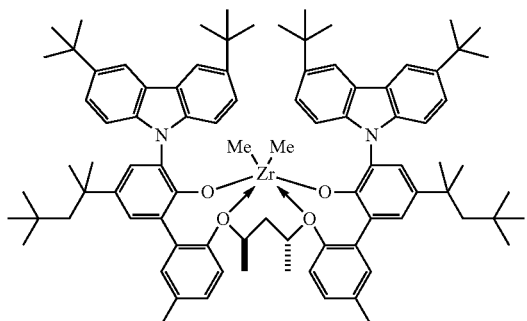
I7
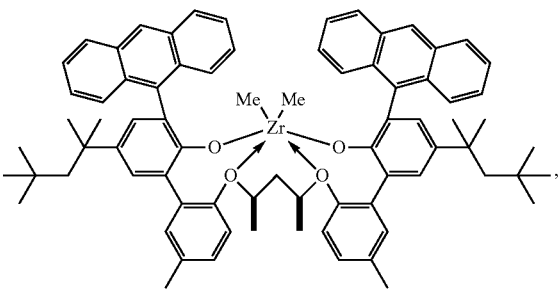
I8
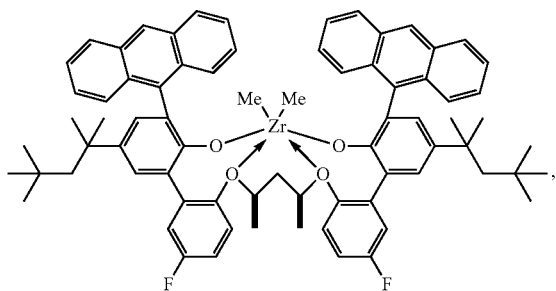
I9
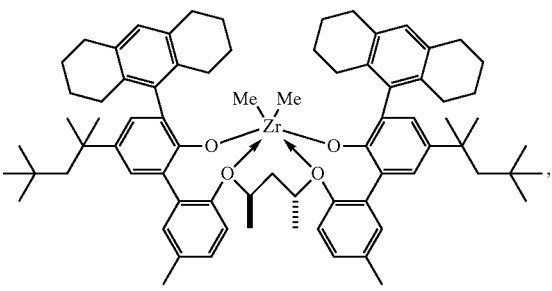
I10
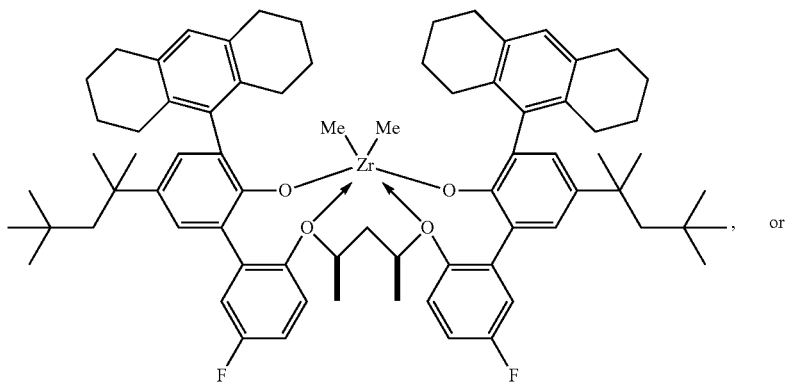
I11
, or
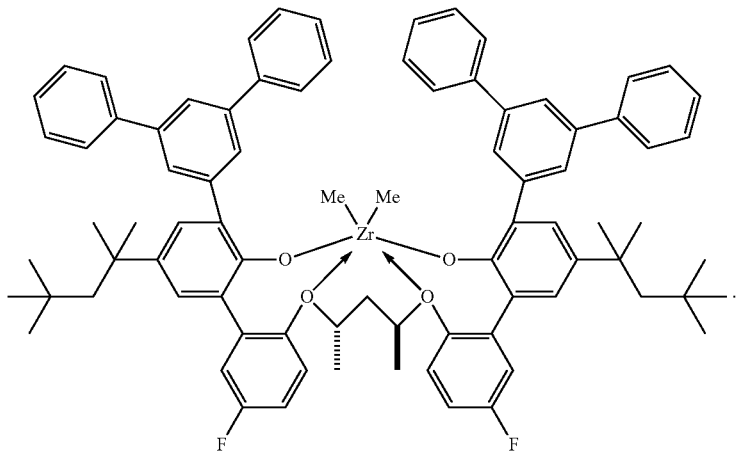
I12
.
* * * * *